United States Patent
Nakano et al.

(10) Patent No.: US 9,624,986 B2
(45) Date of Patent: Apr. 18, 2017

(54) FRICTION ENGAGEMENT DEVICE

(71) Applicant: JATCO LTD, Fuji-shi, Shizuoka (JP)

(72) Inventors: Yusuke Nakano, Yamato (JP); Katsuya Kobayashi, Yokohama (JP)

(73) Assignee: JATCO Ltd, Fuji-Shi (JP)

( * ) Notice: Subject to any disclaimer, the term of this patent is extended or adjusted under 35 U.S.C. 154(b) by 0 days.

(21) Appl. No.: 14/404,262

(22) PCT Filed: May 28, 2013

(86) PCT No.: PCT/JP2013/064686
§ 371 (c)(1),
(2) Date: Nov. 26, 2014

(87) PCT Pub. No.: WO2013/180086
PCT Pub. Date: Dec. 5, 2013

(65) Prior Publication Data
US 2015/0141189 A1 May 21, 2015

(30) Foreign Application Priority Data

May 31, 2012 (JP) ................................. 2012-123864

(51) Int. Cl.
*F15B 15/26* (2006.01)
*F16D 25/12* (2006.01)
(Continued)

(52) U.S. Cl.
CPC ............. *F16D 25/12* (2013.01); *F16D 23/12* (2013.01); *F16D 25/0638* (2013.01); *F16H 3/44* (2013.01)

(58) Field of Classification Search
CPC ............................ F15B 15/26; F16D 25/0638
(Continued)

(56) References Cited

U.S. PATENT DOCUMENTS 3,685,371 A * 8/1972 Crooks ......................... 475/299
4,325,471 A * 4/1982 Schuster ..................... 192/85.38
(Continued)

FOREIGN PATENT DOCUMENTS

JP          07-012221 A      1/1995
JP        2007-255551 A     10/2007
(Continued)

*Primary Examiner* — Stacey Fluhart
(74) *Attorney, Agent, or Firm* — Foley & Lardner LLP

(57) ABSTRACT

In friction engagement device having forward clutch 5 and clutch operation pack 6 controlling engagement/disengagement operation of the forward clutch 5, the clutch operation pack 6 has hydraulic piston 61, engagement pressure piston chamber 62, snap ring 64, diaphragm spring 65 and ball lock mechanism BL. The diaphragm spring 65 provides biasing engagement force to the forward clutch 5 at a clutch side of the hydraulic piston 61. The ball lock mechanism BL restrains movement, in a disengagement direction, of the hydraulic piston 61 at a position where the forward clutch 5 is in an engagement state by the biasing engagement force by exerting ON pressure on the engagement pressure piston chamber 62, and after restraining the movement of the hydraulic piston 61, maintains the restraint of the disengagement direction movement of the hydraulic piston 61 even when the ON pressure of the engagement pressure piston chamber 62 is drawn.

5 Claims, 14 Drawing Sheets

(51) Int. Cl.
*F16D 23/12* (2006.01)
*F16D 25/0638* (2006.01)
*F16H 3/44* (2006.01)

(58) Field of Classification Search
USPC .......... 192/85.25, 85.24, 85.37, 83; 475/116, 475/327
See application file for complete search history.

(56) References Cited

U.S. PATENT DOCUMENTS

| | | | |
|---|---|---|---|
| 8,074,778 B2* | 12/2011 | Jayaram et al. | 192/85.24 |
| 8,875,863 B2* | 11/2014 | Nakano | F16D 25/0638 192/114 R |
| 2010/0179026 A1* | 7/2010 | Grochowski | F16D 25/0638 477/180 |
| 2012/0077634 A1* | 3/2012 | Thompson | 475/116 |
| 2013/0075222 A1* | 3/2013 | Ari | 192/85.63 |

FOREIGN PATENT DOCUMENTS

| | | |
|---|---|---|
| JP | 2010-216501 A | 9/2010 |
| JP | 2012-072855 A | 4/2012 |

\* cited by examiner

STATE CHANGE (CLUTCH OPEN→CLUTCH CLOSE)

STATE CHANGE (CLUTCH OPEN → CLUTCH CLOSE)

STATE CHANGE (CLUTCH OPEN→CLUTCH CLOSE)

STATE CHANGE (CLUTCH OPEN→CLUTCH CLOSE)

STATE CHANGE (CLUTCH CLOSE)

STATE CHANGE (CLUTCH CLOSE→CLUTCH OPEN)

STATE CHANGE (CLUTCH CLOSE→CLUTCH OPEN)

STATE CHANGE (CLUTCH CLOSE→CLUTCH OPEN)

STATE CHANGE (CLUTCH CLOSE→CLUTCH OPEN)

STATE CHANGE (CLUTCH OPEN)

FWD/C
ON PRESSURE CHARGE

HYDRAULIC
PRESSURE OFF

FWD/C
OFF PRESSURE CHARGE

FRICTION ENGAGEMENT DEVICE

The present invention relates to a friction engagement device applied to a frictional engagement element (such as a multiple disc clutch and a multiple disc brake) of an automatic transmission (including CVT, step-AT), where hydraulic pressure is used for control of engagement/disengagement operation of the frictional engagement element.

BACKGROUND ART

As the friction engagement device of the automatic transmission in related arts, there has been known a friction engagement device having a frictional engagement element, a hydraulic piston and a return spring. In this friction engagement device, by exerting an engagement pressure that overcomes a biasing force of the return spring, the engagement operation of the frictional engagement element is performed, and by the biasing force of the return spring by draining the engagement pressure, the disengagement operation of the frictional engagement element is performed (See, for instance, Patent Document 1).

CITATION LIST

Patent Document

Patent Document 1: Japanese Unexamined Patent Application Publication No. 7-12221

SUMMARY OF THE INVENTION

Technical Problem

In the related art friction engagement device, however, in order for an operation state of the frictional engagement element to be in an engagement holding state, there is a need to continue exerting the engagement pressure (an engagement holding pressure) that overcomes the biasing force of the return spring and holds the frictional engagement element at the engagement state. Because of this, there arises problems of consuming much energy for the engagement/disengagement operation of the frictional engagement element, resulting in poor fuel economy in a case of an engine vehicle, and leading to increase in electric cost (power consumption) in a case of an electric vehicle.

That is, it is required to continue driving or operating an oil pump by an engine or a motor in order to continuously produce the engagement holding pressure throughout the engagement holding state of the frictional engagement element, a drive torque loss of the oil pump then becomes large. In addition, since the engagement holding pressure acts on a seal ring that is set at a relatively rotating portion at some midpoint in an hydraulic pathway by which the engagement holding pressure is led throughout the engagement holding state of the frictional engagement element, a friction loss at a seal ring portion becomes large.

The present invention was made in view of the above problems. An object of the present invention is to provide a friction engagement device that is capable of reducing the energy for the engagement operation of the frictional engagement element and friction of the seal ring by eliminating the need for the engagement holding pressure of the frictional engagement element.

Solution to Problem

In order to achieve the above object, the friction engagement device of the present invention has a frictional engagement element that is formed by a first friction plate and a second friction plate respectively connected slidably in an axial direction to a first member and a second member that are coaxially arranged with each other and a frictional engagement element operating unit that controls engagement/disengagement operation of the frictional engagement element, and the frictional engagement element operating unit has a hydraulic piston, an engagement pressure piston chamber, an engagement reaction force receiving member, an elastic member and a lock mechanism.

The hydraulic piston is set movably in the axial direction with respect to the frictional engagement element and has an engagement pressure receiving surface.

The engagement pressure piston chamber exerts an engagement pressure on the engagement pressure receiving surface of the hydraulic piston.

The engagement reaction force receiving member is set in an opposite side position to the hydraulic piston with the frictional engagement element located between the engagement reaction force receiving member and the hydraulic piston and receives an engagement reaction force from the frictional engagement element.

The elastic member is set between an element side end surface of the hydraulic piston and an engagement reaction force receiving surface of the engagement reaction force receiving member and provides a biasing engagement force to the frictional engagement element by moving the hydraulic piston in an engagement direction toward the engagement reaction force receiving member.

The lock mechanism restrains movement, in a disengagement direction, of the hydraulic piston at a position where the frictional engagement element is in an engagement state by the biasing engagement force when exerting the engagement pressure on the engagement pressure piston chamber and moving the hydraulic piston in the engagement direction approaching the frictional engagement element, and after restraining the movement of the hydraulic piston, maintains the restraint of the disengagement direction movement of the hydraulic piston even when the engagement pressure of the engagement pressure piston chamber is drawn.

Effects of the Invention

Accordingly, when exerting the engagement pressure on the engagement pressure piston chamber and moving the hydraulic piston in the engagement direction approaching the frictional engagement element, by the lock mechanism, the movement, in the disengagement direction, of the hydraulic piston is restrained at the position where the frictional engagement element is in the engagement state by the biasing engagement force of the elastic member. Then, after restraining the movement of the hydraulic piston, even when the engagement pressure of the engagement pressure piston chamber is drawn, the restraint of the disengagement direction movement of the hydraulic piston is maintained by the lock mechanism.

That is to say, only by exerting the engagement pressure only in a transition during which the frictional engagement element shifts from a disengagement state to the engagement state, even when the engagement pressure of the engagement pressure piston chamber is drawn after the shift to the engagement state is completed, by the restraint of the movement of the hydraulic piston by the lock mechanism, also by the biasing engagement force by the elastic member at a movement restraint position of the hydraulic piston, the frictional engagement element is held in an engagement holding state.

As a consequence, by eliminating the need for the engagement holding pressure of the frictional engagement element, the engagement operation energy of the frictional engagement element and also the friction of the seal ring can be reduced.

BRIEF DESCRIPTION OF DRAWINGS

FIG. 3A shows a state change of a start transition of "clutch OPEN"→"clutch CLOSE". FIG. 3B shows each characteristic of ON pressure, OFF pressure and a ball position.

FIG. 4A shows a state change of a progression transition of "clutch OPEN-"→"clutch CLOSE". FIG. 4B shows each characteristic of the ON pressure, the OFF pressure and the ball position.

FIG. 5A shows a state change of an end transition (before movement of a ball holing piston) of "clutch OPEN"→"clutch CLOSE". FIG. 5B shows each characteristic of the ON pressure, the OFF pressure and the ball position.

FIG. 6A shows a state change of an end transition (after the movement of the ball holing piston) of "clutch OPEN"→"clutch CLOSE". FIG. 6B shows each characteristic of the ON pressure, the OFF pressure and the ball position.

FIG. 7A shows an engagement state by "clutch CLOSE". FIG. 7B shows each characteristic of the ON pressure, the OFF pressure and the ball position.

FIG. 8A shows a state change of a start transition of "clutch CLOSE-"→"clutch OPEN". FIG. 8B shows each characteristic of the ON pressure, the OFF pressure and the ball position.

FIG. 9A shows a state change of a progression transition of "clutch CLOSE"→"clutch OPEN". FIG. 9B shows each characteristic of the ON pressure, the OFF pressure and the ball position.

FIG. 10A shows a state change of an end transition (movement of a hydraulic piston is in progress) of "clutch CLOSE"→"clutch OPEN". FIG. 10B shows each characteristic of the ON pressure, the OFF pressure and the ball position.

FIG. 11A shows a state change of an end transition (after the movement of the hydraulic piston) of "clutch CLOSE"→"clutch OPEN". FIG. 11B shows each characteristic of the ON pressure, the OFF pressure and the ball position.

FIG. 12A shows a disengagement state by "clutch OPEN". FIG. 12B shows each characteristic of the ON pressure, the OFF pressure and the ball position.

FIG. 13A shows an ON pressure charge state to the forward clutch. FIG. 13B shows a hydraulic pressure OFF state. FIG. 13C shows an OFF pressure charge state to the forward clutch.

EMBODIMENTS FOR CARRYING OUT THE INVENTION

In the following description, best mode that realizes a friction engagement device of the present invention will be explained according to an embodiment 1 shown by the drawings.

Embodiment 1

First, a configuration will be explained.

The configuration of the friction engagement device of the embodiment 1 will be separately explained by "Overall configuration", "Configuration of Friction engagement device" and "Detailed configuration of Ball lock mechanism".

[Overall Configuration]

Figure 1:
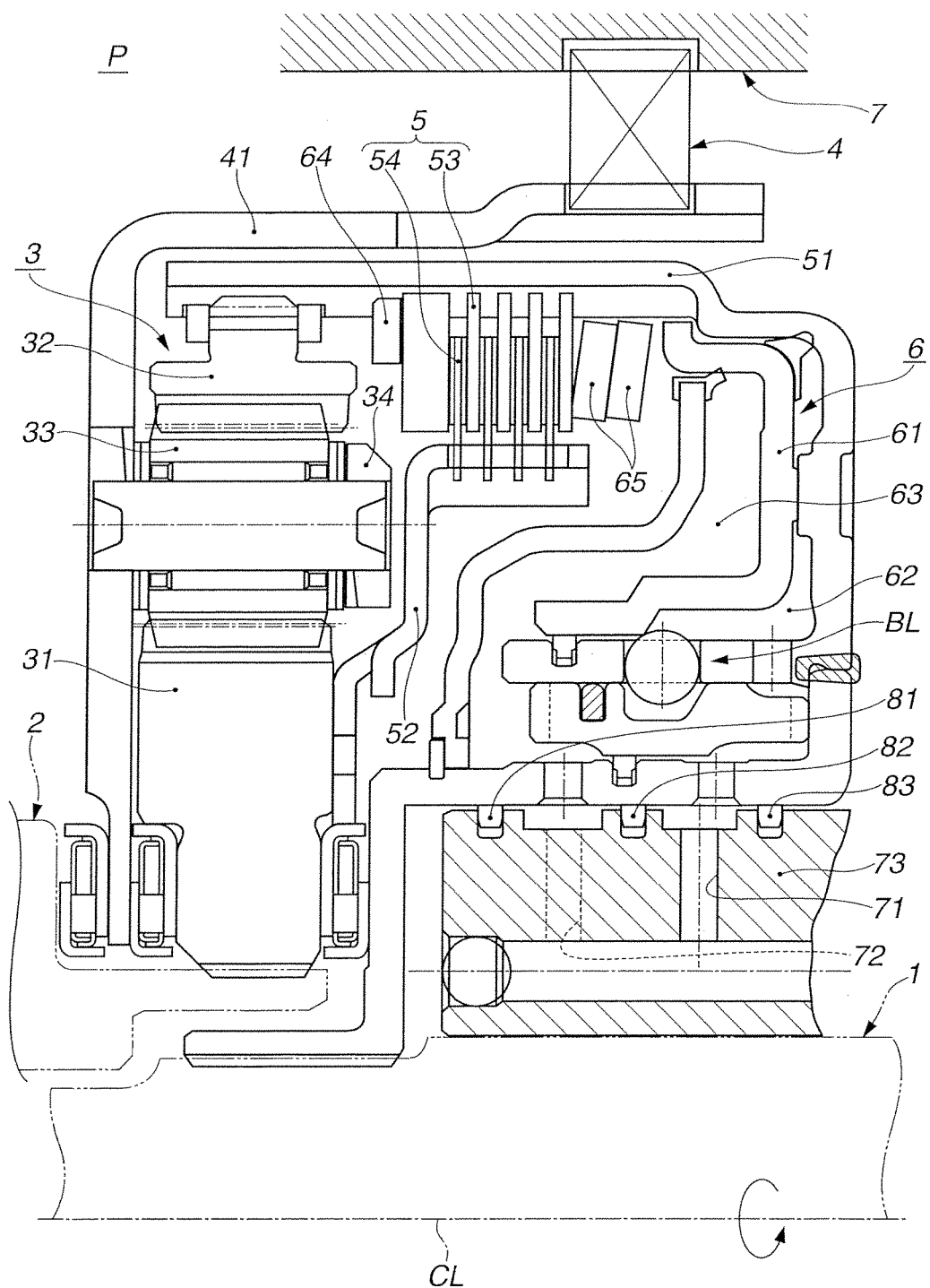
FIG. 1 is a sectional view of a forward-reverse switching mechanism of a belt-type continuously variable transmission to which a friction engagement device of an embodiment 1 is applied.

FIG. 1 shows a forward-reverse switching mechanism of a belt-type continuously variable transmission to which the friction engagement device of the embodiment 1 is applied. The overall configuration will be explained below with reference to FIG. 1.

A forward-reverse switching mechanism P of the belt-type continuously variable transmission has, as shown in FIG. 1, a single pinion type planetary gear 3 (a planetary gear) between a drive input shaft 1 from an engine (a drive source, not shown) and a transmission input shaft 2 to the belt-type continuously variable transmission (not shown). A reverse brake 4, a forward clutch 5 (a frictional engagement element) and a clutch operation pack 6 (a frictional engagement element operating unit or a frictional engagement element operating means) are arranged around the single pinion type planetary gear 3.

The single pinion type planetary gear 3 has a sun gear 31 (a rotary member), a ring gear 32 (a rotary member) and a carrier 34 (a rotary member) that supports a pinion 33 meshing with the sun gear 31 and the ring gear 32. The sun gear 31 is connected to the transmission input shaft 2 by spline connection. The ring gear 32 is connected to the drive input shaft 1 through a forward clutch drum 51 by spline connection.

The reverse brake 4 is a multiple disc brake that is engaged when selecting a reverse travel range (R-range). By brake engagement of this reverse brake 4, the carrier 34 of the single pinion type planetary gear 3 is fixed to a transmission case 7 through a reverse brake drum 41. That is, by the carrier fixing by the engagement of the reverse brake 4, a rotation direction (an input rotation direction) of the ring gear 32 and a rotation direction of the sun gear 31 become opposite to each other, and a rotary driving force by a rotation opposite to an input rotation is transmitted to the transmission input shaft 2 through the sun gear 31. The rotary driving force is transmitted from this transmission input shaft 2 to a primary pulley→a belt→a secondary pulley (all not shown). Here, the transmission case 7 supports the forward clutch drum 51 by the drive input shaft 1 through seal rings 81, 82 and 83. The transmission case 7 has, as an integral component, a drum supporting portion 73 in which an ON pressure oil passage 71 and an OFF pressure oil passage 72 are formed.

The forward clutch 5 is a multiple disc clutch that is engaged when selecting a forward travel range (D-range etc.). This forward clutch 5 has the forward clutch drum 51 (a first member), a forward clutch hub 52 (a second member), a driven plate 53 (a first friction plate) and a drive plate 54 (a second friction plate). The forward clutch drum 51 connects the drive input shaft 1 and the ring gear 32 (one of the rotary members) of the single pinion type planetary gear 3. The forward clutch hub 52 is connected to the sun gear 31 (one of the remaining rotary members) of the single pinion type planetary gear 3. That is, by the fact that the two rotary members (the sun gear 31 and the ring gear 32) of the single pinion type planetary gear 3 are directly connected together by the engagement of the forward clutch 5, the single pinion type planetary gear 3 integrally rotates, then a rotary driving force by the same rotation direction and rotation speed as those of the input rotation is transmitted to the transmission input shaft 2 through the sun gear 31. The rotary driving force is transmitted from this transmission input shaft 2 to the primary pulley→the belt→the secondary pulley (all not shown).

The clutch operation pack 6 is a unit that controls engagement/disengagement operation of the forward clutch 5. This clutch operation pack 6 has a hydraulic piston 61, an engagement pressure piston chamber 62, a disengagement pressure piston chamber 63, a snap ring 64 (an engagement reaction force receiving member), a diaphragm spring 65 (an elastic member) and a ball lock mechanism BL (a lock mechanism).

[Configuration of Friction Engagement Device]

Figure 2:
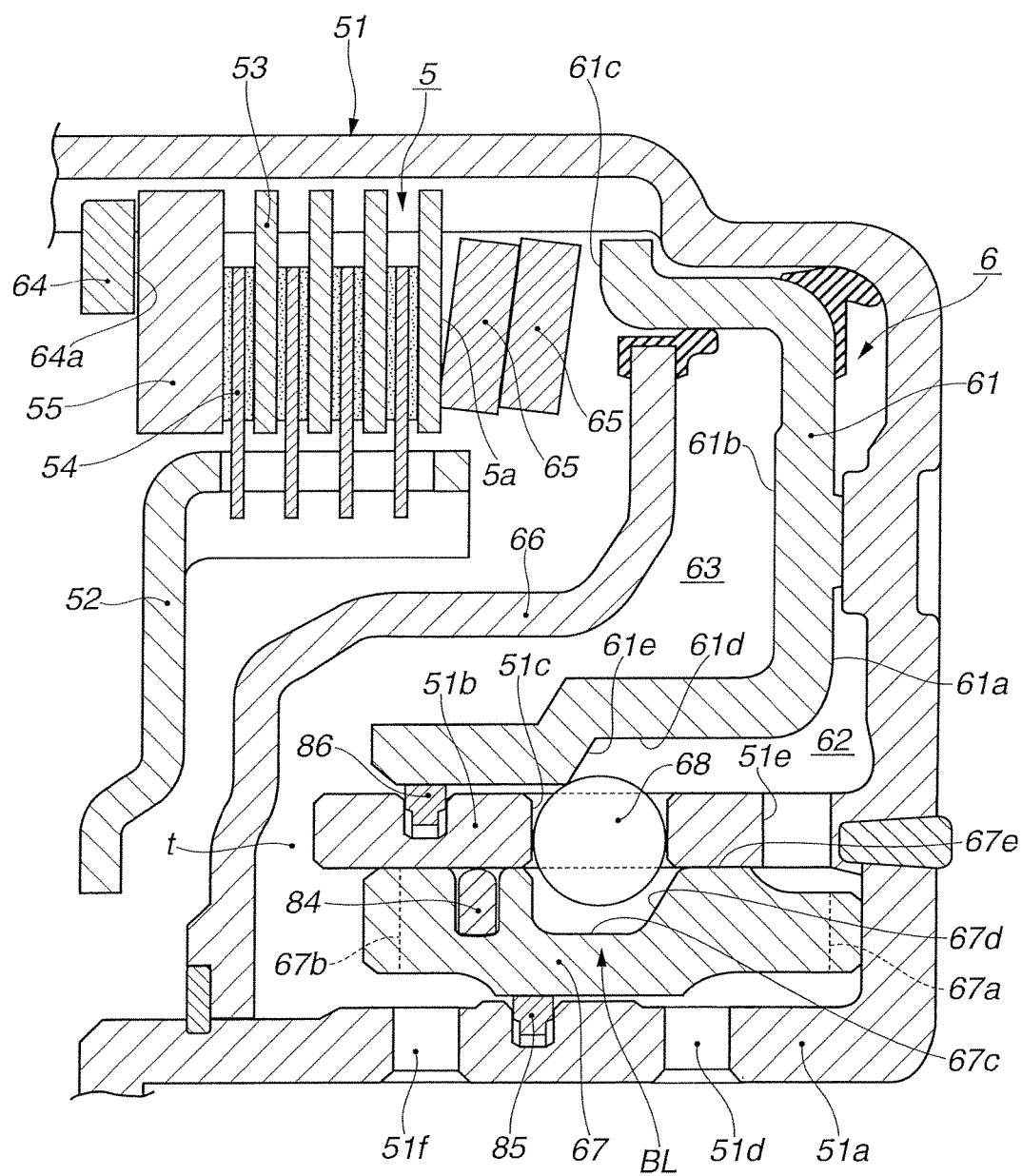
FIG. 2 is an enlarged sectional view showing details of a forward clutch and a clutch operation pack that form the friction engagement device of the embodiment 1.

FIG. 2 shows details of the forward clutch 5 and the clutch operation pack 6 that form the friction engagement device of the embodiment 1. The configuration of the friction engagement device (the forward clutch 5 and the clutch operation pack 6) will be explained below with reference to FIG. 2.

The forward clutch 5 has, as shown in FIG. 2, the forward clutch drum 51 (the first member), the forward clutch hub 52 (the second member), the driven plate 53 (the first friction plate), the drive plate 54 (the second friction plate) and a retainer plate 55.

The forward clutch drum 51 and the forward clutch hub 52 are coaxially arranged with each other with a rotation center axis CL (see FIG. 1) being a rotation center. The driven plate 53 is connected slidably in an axial direction to the forward clutch drum 51 by spline connection. The drive plate 54 is connected slidably in the axial direction to the forward clutch hub 52 by spline connection. Four driven plates 53 and four drive plates 54 are alternately arranged, and a clutch facing is attached to both frictional side surfaces of the drive plate 54. Here, both numbers of the driven plates 53 and the drive plates 54 are increased or decreased according to an input torque that is allowed by the transmission.

The retainer plate 55 is set between the drive plate 54 arranged at an opposite side end portion to the hydraulic piston 61 and the snap ring 64 fixed in a groove of the forward clutch drum 51. One side of this retainer plate 55 is a frictional engagement surface. Then, by setting a thickness, in the axial direction, of the retainer plate 55 to be thicker than that of the driven plate 53, falling down of the driven plate 53 and the drive plate 54 that form a multiple friction plate can be prevented.

The clutch operation pack 6 has, as shown in FIG. 2, the hydraulic piston 61, the engagement pressure piston chamber 62, the disengagement pressure piston chamber 63, the snap ring 64 (the engagement reaction force receiving member), the diaphragm spring 65 (the elastic member), a partition plate 66 and the ball lock mechanism BL (the lock mechanism).

The hydraulic piston 61 is set movably in the axial direction with respect to the forward clutch 5. One of both piston surfaces of the hydraulic piston 61 is an engagement pressure receiving surface 61a, and the other is a disengagement pressure receiving surface 61b.

The engagement pressure piston chamber 62 is an oil chamber defined between the forward clutch drum 51 and the hydraulic piston 61 in order that an ON pressure (an engagement pressure) acts on the engagement pressure receiving surface 61a of the hydraulic piston 61.

The disengagement pressure piston chamber 63 is an oil chamber defined between the partition plate 66 secured to the forward clutch drum 51 and the hydraulic piston 61 in order that an OFF pressure (a disengagement pressure) acts on the disengagement pressure receiving surface 61b of the hydraulic piston 61.

The snap ring 64 is set in an opposite side position to the hydraulic piston 61 with the forward clutch 5 located between the snap ring 64 and the hydraulic piston 61. The snap ring 64 receives an engagement reaction force which the forward clutch 5 receives.

The diaphragm spring 65 is set in a position from a clutch side end surface 61c (an element side end surface) of the hydraulic piston 61 to an engagement reaction force receiving surface 64a of the snap ring 64, namely between the clutch side end surface 61c of the hydraulic piston 61 and a piston side end surface 5a of the forward clutch 5. Regarding this diaphragm spring 65, double diaphragm springs 65 are provided and arranged in the axial direction. By moving the hydraulic piston 61 in an engagement direction toward the snap ring 64, the diaphragm spring 65 provides a biasing engagement force to the forward clutch 5. Here, the number of the diaphragm spring 65 could be one or might be two or more according to the biasing engagement force.

The ball lock mechanism BL restrains movement, in a disengagement direction, of the hydraulic piston 61 at a position where the forward clutch 5 is in an engagement state by the biasing engagement force of the diaphragm spring 65 when exerting the ON pressure (the engagement pressure) on the engagement pressure piston chamber 62 and moving the hydraulic piston 61 in the engagement direction approaching the forward clutch 5. Then, after restraining the movement of the hydraulic piston 61, the ball lock mechanism BL maintains this restraint of the disengagement direction movement of the hydraulic piston 61 even when the engagement pressure of the engagement pressure piston chamber 62 is drawn.

[Detailed Configuration of Ball Lock Mechanism]

FIG. 2 shows details of the forward clutch 5 and the clutch operation pack 6 that form the friction engagement device of the embodiment 1. The configuration of the ball lock mechanism BL included in the clutch operation pack 6 will be explained below with reference to FIG. 2.

As shown in FIG. 2, the ball lock mechanism BL is installed inside the forward clutch drum 51. The ball lock mechanism BL is formed by the hydraulic piston 61 of the clutch operation pack 6 and also a ball holding piston 67 and a ball 68.

The hydraulic piston 61 is the piston set movably in the axial direction with respect to the forward clutch 5, as mentioned above. As a configuration associated with the ball lock mechanism BL, the hydraulic piston 61 is provided with a hydraulic piston side accommodating portion 61d and a hydraulic piston side tapered surface 61e. The hydraulic piston side accommodating portion 61d accommodates the ball 68 when restraining the movement, in the disengagement direction, of the hydraulic piston 61. The hydraulic piston side tapered surface 61e is formed continuously with the hydraulic piston side accommodating portion 61d. The hydraulic piston side tapered surface 61e pushes the ball 68 inwards by a piston stroke that releases or removes the restraint of the disengagement direction movement of the hydraulic piston 61. Here, a depth of the hydraulic piston side accommodating portion 61d is set to a size of about $\frac{2}{5}$ of an outside diameter of the ball 68. An inclination angle of the hydraulic piston side tapered surface 61e is set to an about 45-degree angle. However, the depth of the hydraulic piston side accommodating portion 61d could be set to be larger or smaller than the size of about $\frac{2}{5}$ of the outside diameter of the ball 68 depending on a design of the transmission. Also, the inclination angle of the hydraulic piston side tapered surface 61e could be set to be greater or less than the 45-degree angle depending on the design of the transmission.

The ball holding piston 67 is disposed in a cylindrical space defined by an inner peripheral cylinder portion 51a of the forward clutch drum 51 that covers the hydraulic piston 61 and a partition cylindrical wall portion 51b that protrudes from the forward clutch drum 51 in the axial direction. Then, the ball holding piston 67 moves in the axial direction according to the operation of the ON pressure (the engagement pressure) and the OFF pressure (the disengagement pressure). That is, a gap between an outer peripheral surface of the ball holding piston 67 and the partition cylindrical wall portion 51b is sealed by a seal ring 84. A gap between an inner peripheral surface of the ball holding piston 67 and the inner peripheral cylinder portion 51a is sealed by a seal ring 85. A gap between an inner peripheral surface of the hydraulic piston 61 and the partition cylindrical wall portion 51b is sealed by a seal ring 86. With these settings, an engagement pressure piston chamber 62 side and a disengagement pressure piston chamber 63 side are defined with sealing performance secured at both sides of the hydraulic piston 61, including the ball holding piston 67. Then, an ON pressure port 51d that opens at the forward clutch drum 51 and the engagement pressure piston chamber 62 communicate with each other through an ON pressure communication groove 67a that is formed at the ball holding piston 67 and an ON pressure communication hole 51e that opens at the partition cylindrical wall portion 51b. Further, an OFF pressure port 51f that opens at the forward clutch drum 51 and the disengagement pressure piston chamber 63 communicate with each other through an OFF pressure communication groove 67b that is formed at the ball holding piston 67 and an OFF pressure communication clearance t that is created between an edge portion of the partition cylindrical wall portion 51b and the partition plate 66.

The ball holding piston 67 has a holding piston side accommodating portion 67c, a holding piston side tapered surface 67d and a holding piston side lock surface 67e. The holding piston side accommodating portion 67c accommodates the ball 68 when allowing the movement, in the disengagement direction, of the hydraulic piston 61. The holding piston side tapered surface 67d is formed continuously with the holding piston side accommodating portion 67c. The holding piston side tapered surface 67d pushes out the ball 68 outwards by a piston stroke that restrains the disengagement direction movement of the hydraulic piston 61. The holding piston side lock surface 67e is formed continuously with the holding piston side tapered surface 67d. The holding piston side lock surface 67e locks a position of the ball 68 with the ball 68 held pushed out. Here, a depth of the holding piston side accommodating portion 67c is set to a size of about $\frac{1}{2}$ of the outside diameter of the ball 68. An inclination angle of the holding piston side tapered surface 67d is set to an about 45-degree angle.

The ball 68 is set in a ball hole 51c that opens at the partition cylindrical wall portion 51b. The ball 68 receives a force from each of the both tapered surfaces 61e and 67d of the hydraulic piston 61 and the ball holding piston 67 according to the axial direction movement of the both pistons 61 and 67 by the operation of the ON pressure (the engagement pressure) and the OFF pressure (the disengagement pressure), and moves in a radial direction between a lock position and a lock release position. That is, an inside diameter of the ball hole 51c is set to be slightly greater than the outside diameter of the ball 68. Here, the ball holes 51c and the balls 68 are set at a plurality of positions in a circumferential direction according to an engagement torque capacity.

Functions performed by the ball lock mechanism BL configured as described above are enumerated below.

(a) When exerting the ON pressure (the engagement pressure) on the engagement pressure piston chamber 62 and moving the hydraulic piston 61 in the engagement direction approaching the forward clutch 5, the ball lock mechanism BL restrains the movement, in the disengagement direction, of the hydraulic piston 61 at the position where the forward clutch 5 is in the engagement state by the biasing engagement force of the diaphragm spring 65.

(b) After restraining the movement of the hydraulic piston 61, the ball lock mechanism BL maintains the restraint of the disengagement direction movement of the hydraulic piston 61 even when the ON pressure (the engagement pressure) of the engagement pressure piston chamber 62 is drawn.

(c) When exerting the ON pressure (the engagement pressure) on the engagement pressure piston chamber 62 after restraining the disengagement direction movement of the hydraulic piston 61 at the position where the forward clutch 5 is in the engagement state by the biasing engagement force of the diaphragm spring 65, the ball lock mechanism BL maintains the restraint of the disengagement direction movement of the hydraulic piston 61 while allowing the engagement direction movement of the hydraulic piston 61.

(d) By exerting the OFF pressure (the disengagement pressure) on the disengagement pressure piston chamber 63, the ball lock mechanism BL releases or removes the restraint of the disengagement direction movement of the hydraulic piston 61.

Next, working or operation will be explained.

Working or operation of the friction engagement device of the embodiment 1 will be separately explained by "Engagement operation of Forward clutch", "Disengagement operation of Forward clutch", "Clutch engagement/disengagement operation using Ball lock mechanism" and "Comparison with Comparative example that requires no engagement holding pressure".

[Engagement Operation of Forward Clutch]

Engagement operation of the forward clutch 5 will be explained with reference to FIGS. 3 to 7, each of which shows a state change when performing the engagement of the forward clutch 5.

Start Transition of "Clutch OPEN"→"Clutch CLOSE"

Figure 3A:
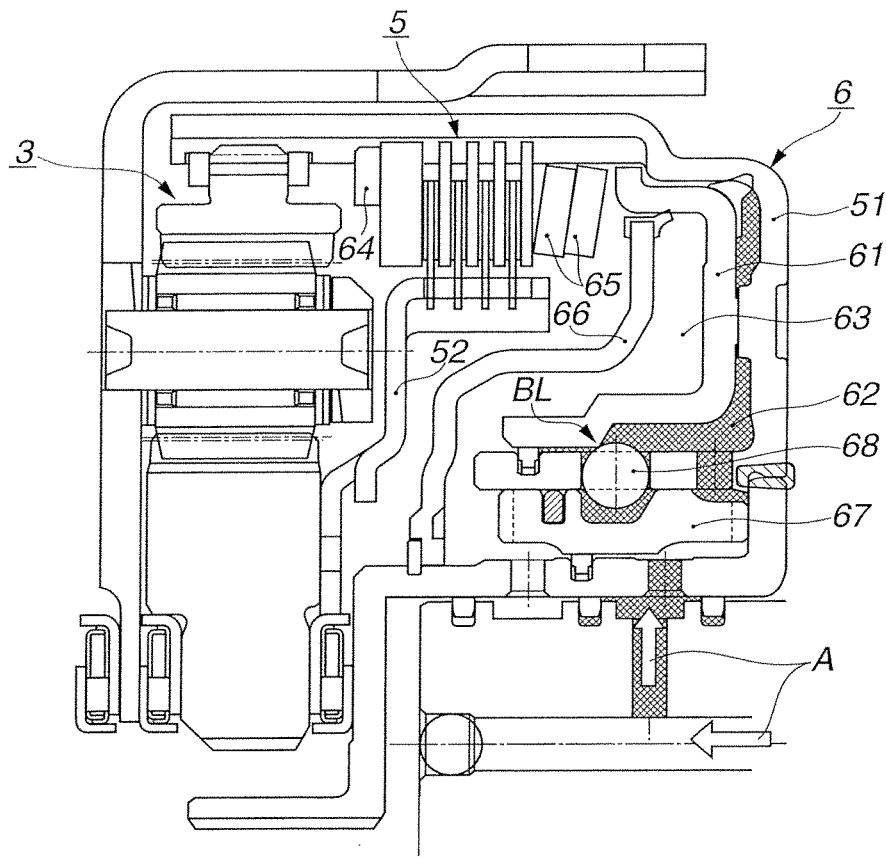
FIGS. 3A and 3B are drawings for explaining an engagement operation state of the forward clutch by the friction engagement device of the embodiment 1.
Figure 3B:
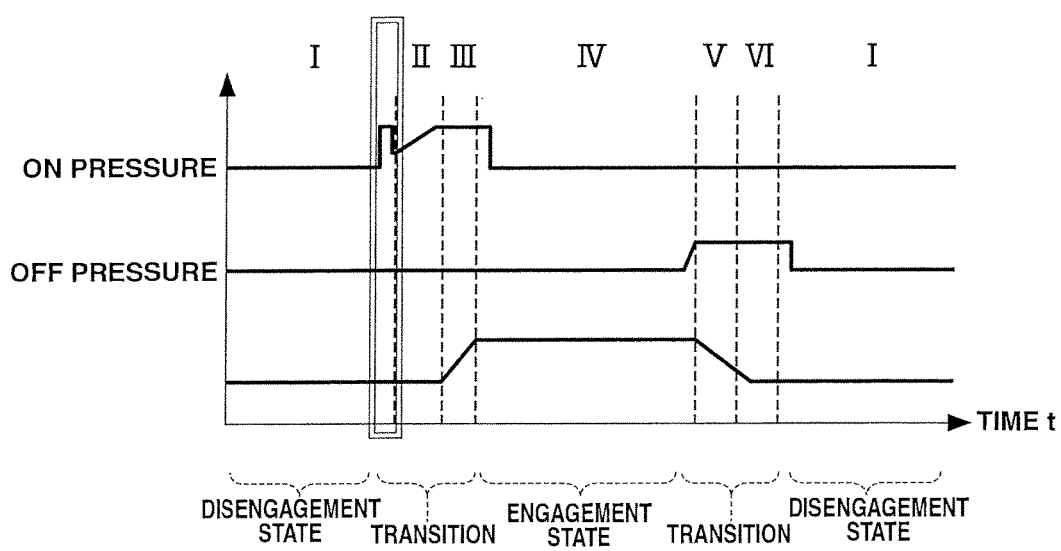

In order to shift the forward clutch 5 from a disengagement state shown in FIG. 1 to the engagement state, first, when exerting the ON pressure (an initial pressure of the engagement pressure), as shown by arrows A in FIG. 3A, this pressure passes in order of ON pressure oil passage 71→ON pressure port 51d→ON pressure communication groove 67a→ON pressure communication hole 51e, then the engagement pressure piston chamber 62 is charged with the ON pressure (the engagement pressure). At this time, as shown in FIG. 3B, the ON pressure temporarily shows a maximum pressure characteristic by the fact that the ON pressure offsets or fills a loss stroke. The OFF pressure remains unchanged at 0 (zero) pressure, and the ball position also remains unchanged at the lock release position.

Progression Transition of "Clutch OPEN"→"Clutch CLOSE"

Figure 4A:
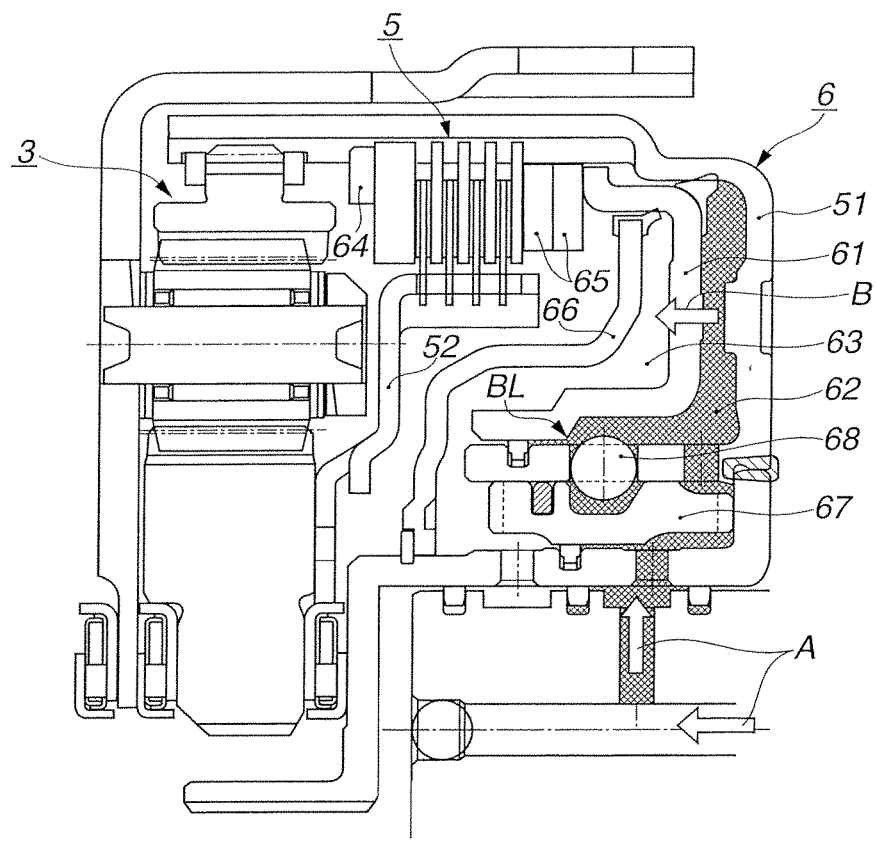
FIGS. 4A and 4B are drawings for explaining the engagement operation state of the forward clutch by the friction engagement device of the embodiment 1.
Figure 4B:
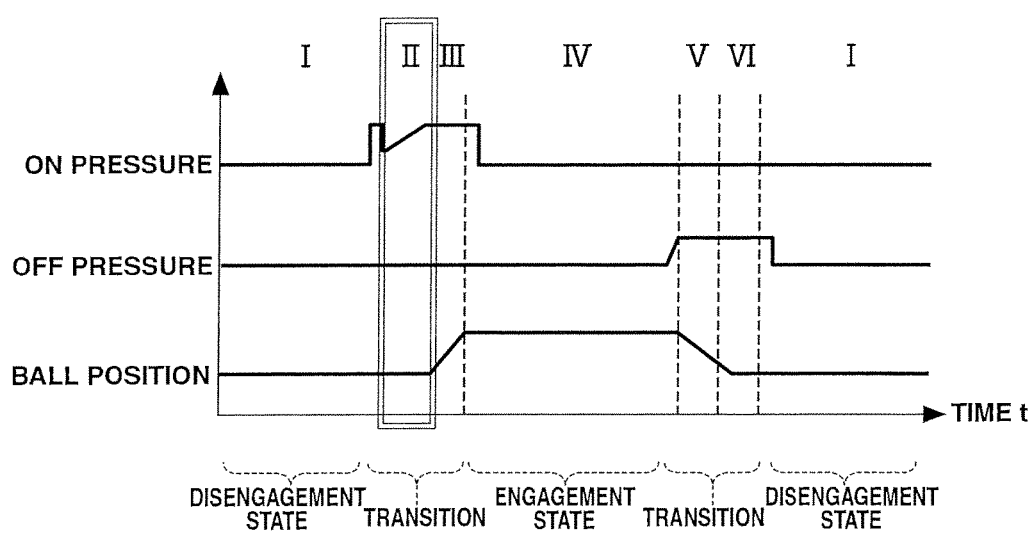

In order to progress the operation of the forward clutch 5 from the state shown in FIG. 3 to the engagement state, when gradually increasing the ON pressure, as shown by arrows A in FIG. 4A, the pressure passes in order of ON pressure oil passage 71→ON pressure port 51d→ON pressure communication groove 67a→ON pressure communication hole 51e, and the ON pressure (the engagement pressure) is exerted on the engagement pressure piston chamber 62, then the hydraulic piston 61 moves as shown by an arrow B in FIG. 4A. An engagement force by this stroke (movement) of the hydraulic piston 61 is balanced with the biasing engagement force of the diaphragm spring 65, and further while the diaphragm spring 65 is being elastically deformed, the forward clutch 5 shifts to the engagement state. At this time, as shown in FIG. 4B, the characteristic of the ON pressure increases with the lapse of time. The OFF pressure remains unchanged at 0 (zero) pressure, and the ball position also remains unchanged at the lock release position.

End Transition (Before Movement of Ball Holing Piston) of "Clutch OPEN"→"Clutch CLOSE"

Figure 5A:
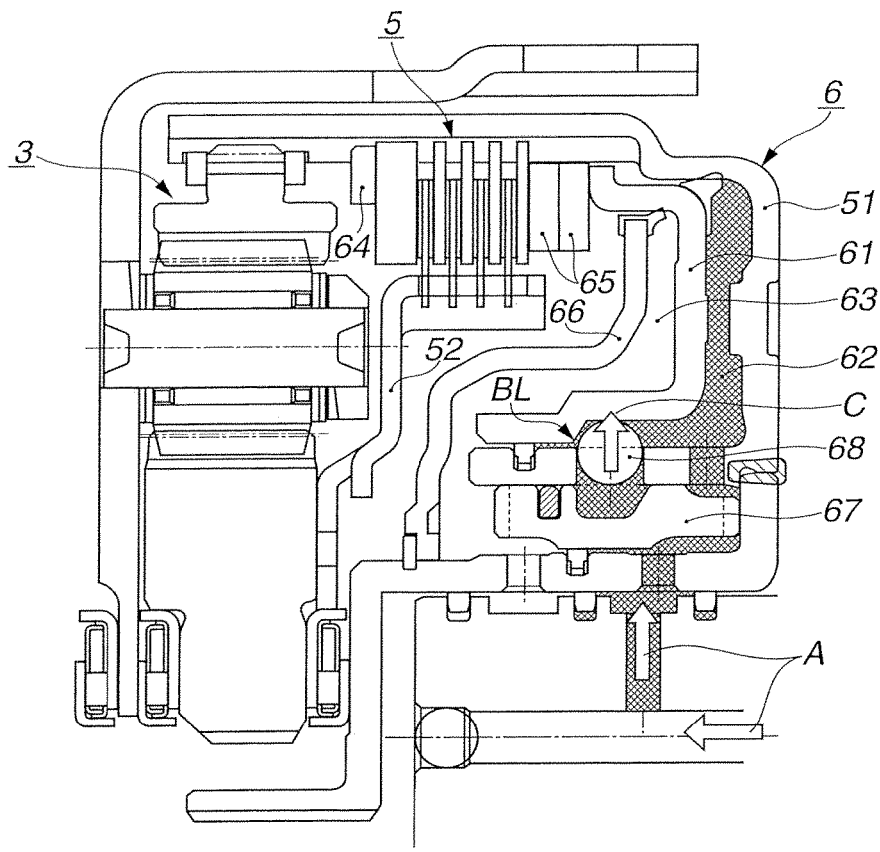
FIGS. 5A and 5B are drawings for explaining the engagement operation state of the forward clutch by the friction engagement device of the embodiment 1.
Figure 5B:
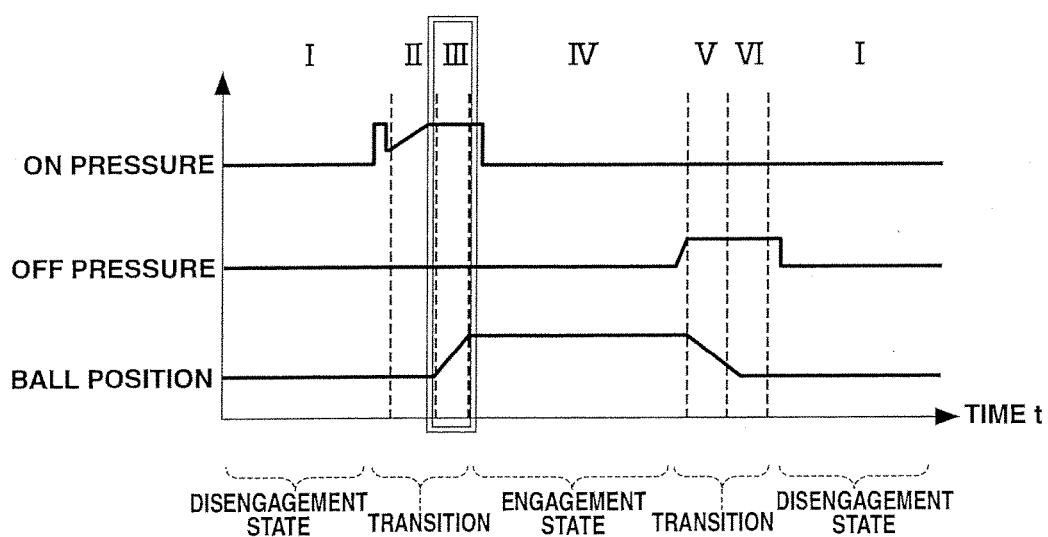

In order to progress the operation of the forward clutch 5 from the engagement state shown in FIG. 4 to a lock state, when holing a high ON pressure, as shown by an arrow C in FIG. 5A, the ball 68 moves in a radially outward direction by a centrifugal force due to the rotation and the hydraulic pressure, and the ball 68 is accommodated in the hydraulic piston side accommodating portion 61d. At this time, as shown in FIG. 5B, the ON pressure shows the characteristic in which the high pressure is held even when time elapses. The OFF pressure remains unchanged at 0 (zero) pressure. The ball position shifts from the lock release position to the lock position.

End Transition (after Movement of Ball Holing Piston) of "Clutch OPEN"→"Clutch CLOSE"

Figure 6A:
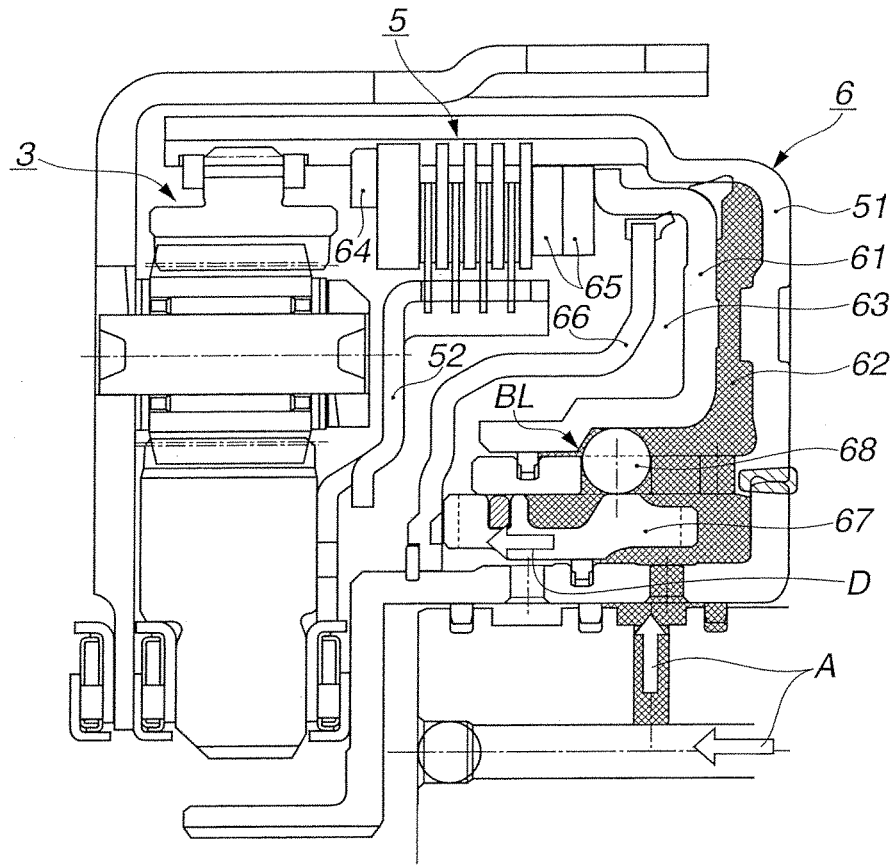
FIGS. 6A and 6B are drawings for explaining the engagement operation state of the forward clutch by the friction engagement device of the embodiment 1.
Figure 6B:
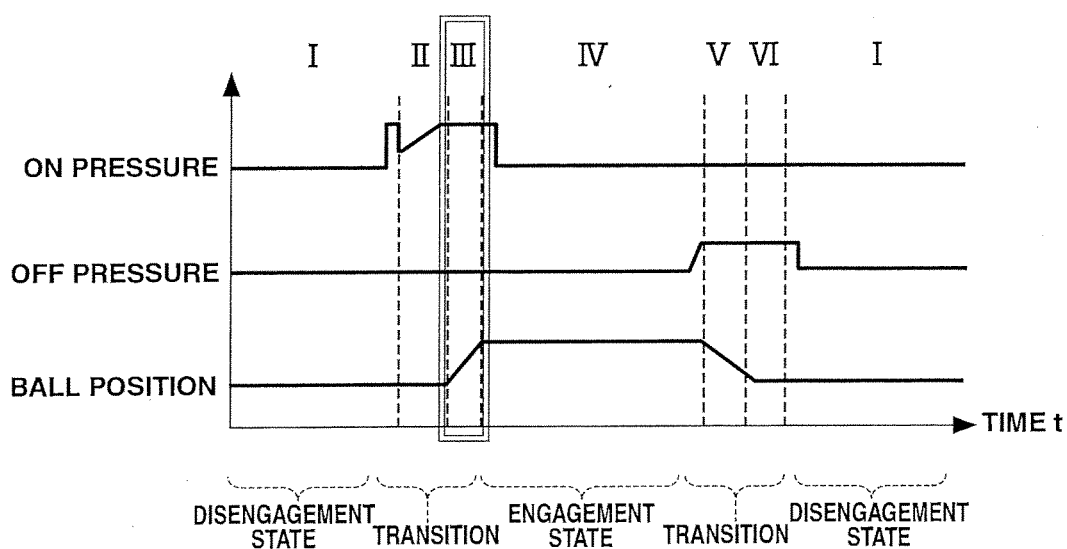

In order to progress the operation of the forward clutch 5 from the lock state shown in FIG. 5 to a lock holding state, when continuing holding the high ON pressure, as shown by an arrow D in FIG. 6A, the ball holding piston 67 moves in the axial direction (toward the forward clutch 5) by the fact that the ON pressure acts on the ball holding piston 67. The ball holding piston 67 then holds or supports the ball 68 accommodated in the hydraulic piston side accommodating portion 61d by and on the holding piston side lock surface 67e. At this time, as shown in FIG. 6B, the ON pressure shows the characteristic in which the high pressure is held even when time elapses. The OFF pressure remains unchanged at 0 (zero) pressure. The ball position shifts from the lock release position to the lock position.

Engagement State by "Clutch CLOSE"

Figure 7A:
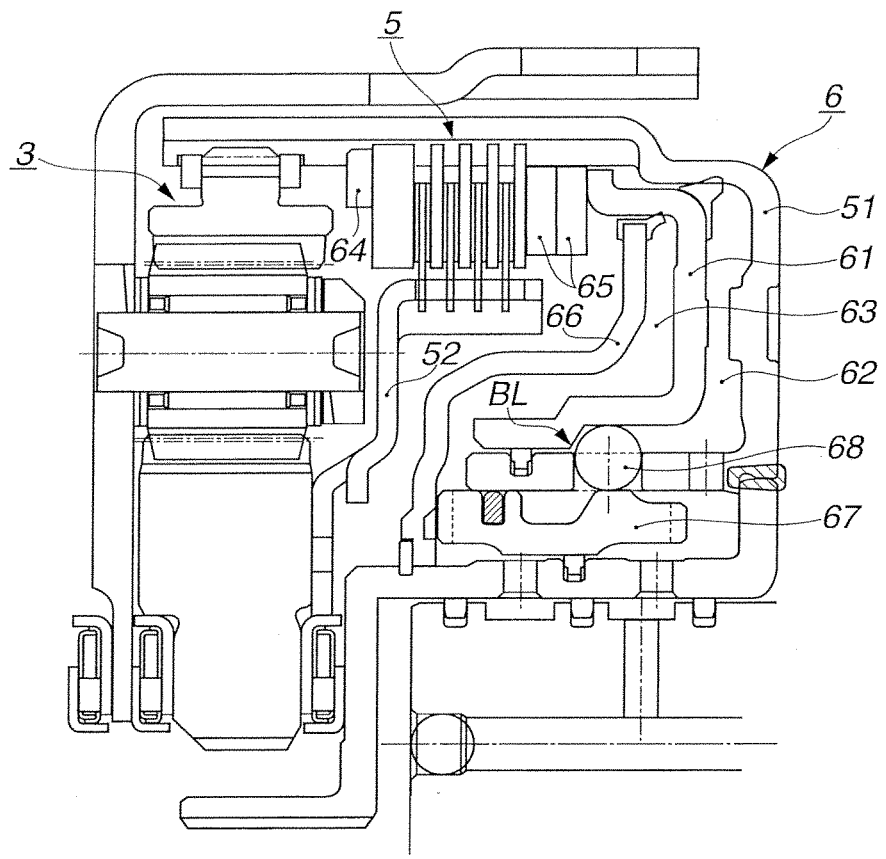
FIGS. 7A and 7B are drawings for explaining the engagement operation state of the forward clutch by the friction engagement device of the embodiment 1.
Figure 7B:
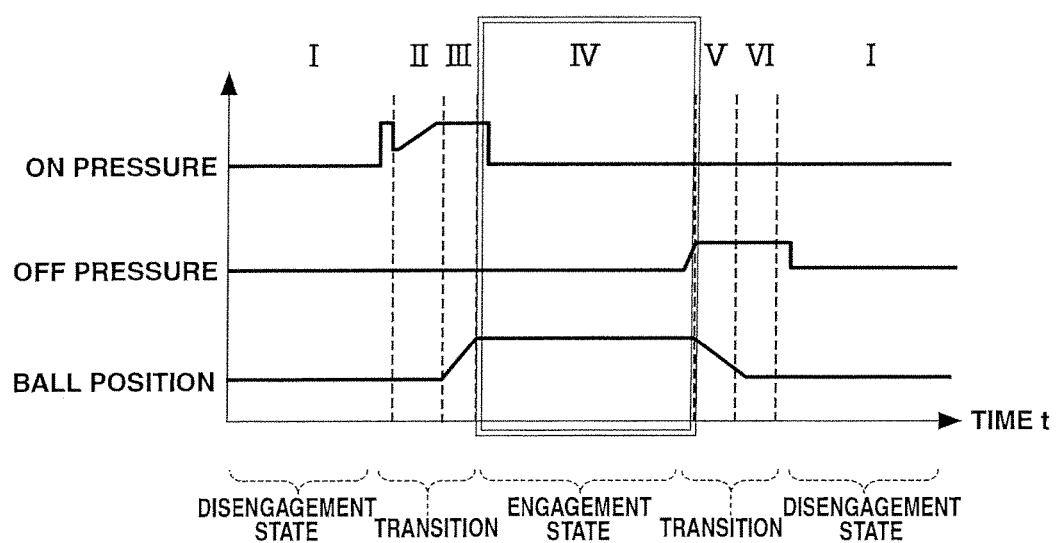

When draining the ON pressure (the engagement pressure) having been exerted on the engagement pressure piston chamber 62 after progressing the operation of the forward clutch 5 to the lock holding state shown in FIG. 6, as shown in FIG. 7A, the engagement state, in which the ball 68 accommodated in the hydraulic piston side accommodating portion 61d of the hydraulic piston 61 is held or supported by and on the holding piston side lock surface 67e of the ball holding piston 67, is maintained. At this time, as shown in FIG. 7B, the ON pressure is 0 (zero) pressure, and the OFF pressure remains unchanged at 0 (zero) pressure. The ball position is kept at the lock position.

[Disengagement Operation of Forward Clutch]

Disengagement operation of the forward clutch 5 will be explained with reference to FIGS. 8 to 12, each of which shows a state change when performing the disengagement of the forward clutch 5.

Start Transition of "Clutch CLOSE"→"Clutch OPEN"

Figure 8A:
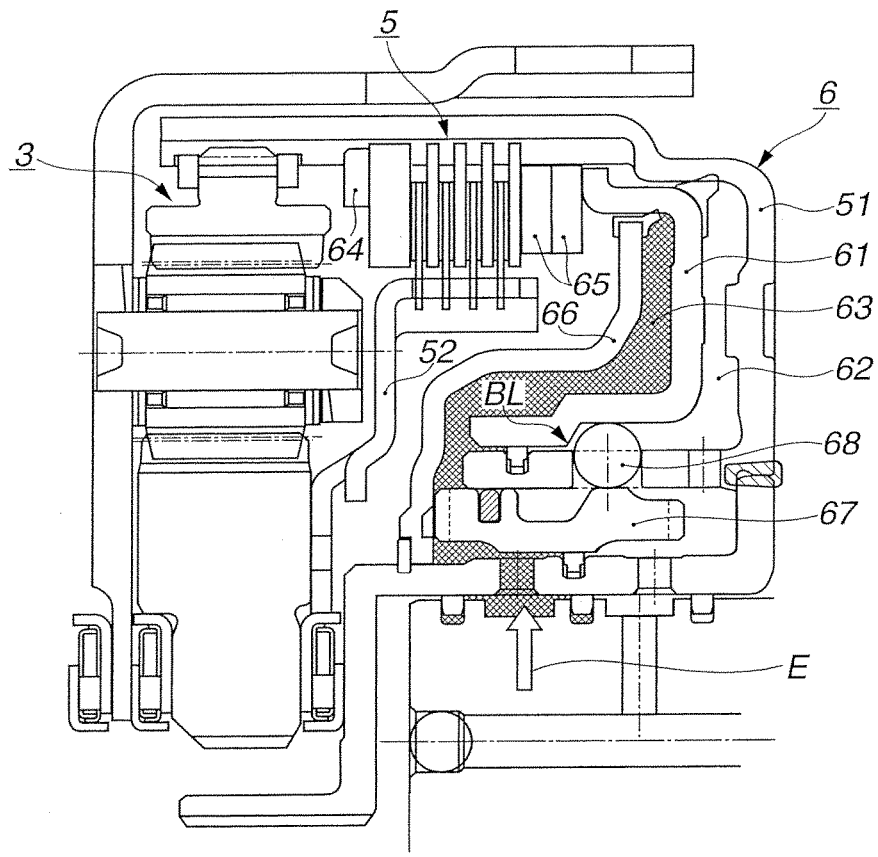
FIGS. 8A and 8B are drawings for explaining a disengagement operation state of the forward clutch by the friction engagement device of the embodiment 1.
Figure 8B:
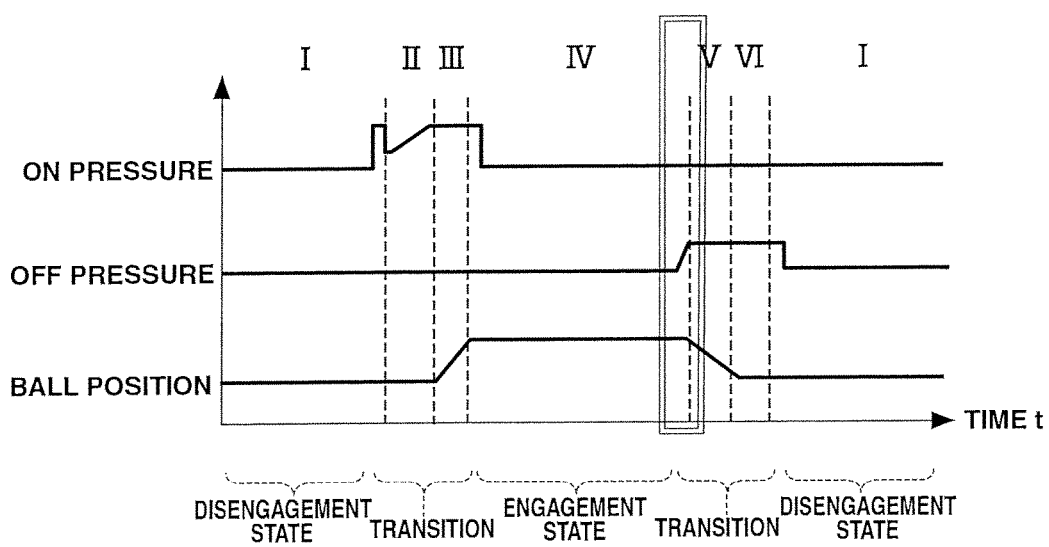

In a case where the engagement state of the forward clutch 5, in which the ball position is kept at the lock position with the ON pressure and the OFF pressure held at 0 (zero) pressure as shown in FIGS. 7A and 7B, is shifted to the disengagement state, first, when exerting the OFF pressure (an initial pressure of the disengagement pressure), as shown by an arrow E in FIG. 8A, this pressure passes in order of OFF pressure oil passage 72→OFF pressure port 51f→OFF pressure communication groove 67b→OFF pressure communication clearance t, then the disengagement pressure piston chamber 63 is charged with the OFF pressure (the disengagement pressure). At this time, as shown in FIG. 8B, the ON pressure remains unchanged at 0 (zero) pressure. A characteristic of the OFF pressure rises at a steep angle. The ball position is still at the lock position.

Progression Transition of "Clutch CLOSE"→"Clutch OPEN"

Figure 9A:
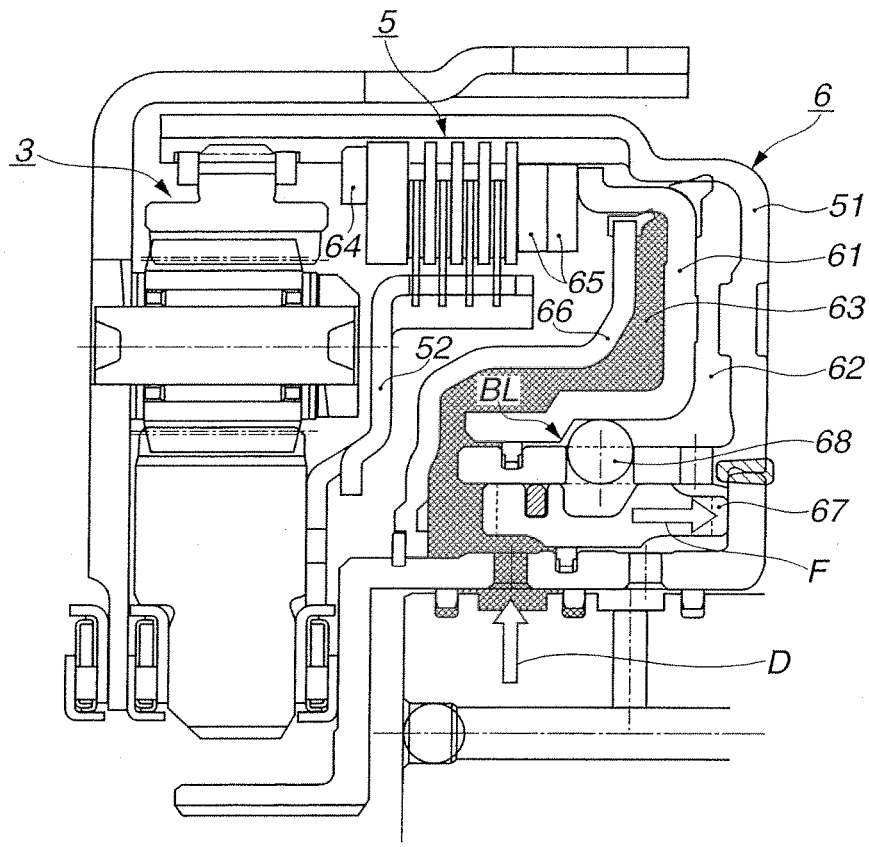
FIGS. 9A and 9B are drawings for explaining the disengagement operation state of the forward clutch by the friction engagement device of the embodiment 1.
Figure 9B:
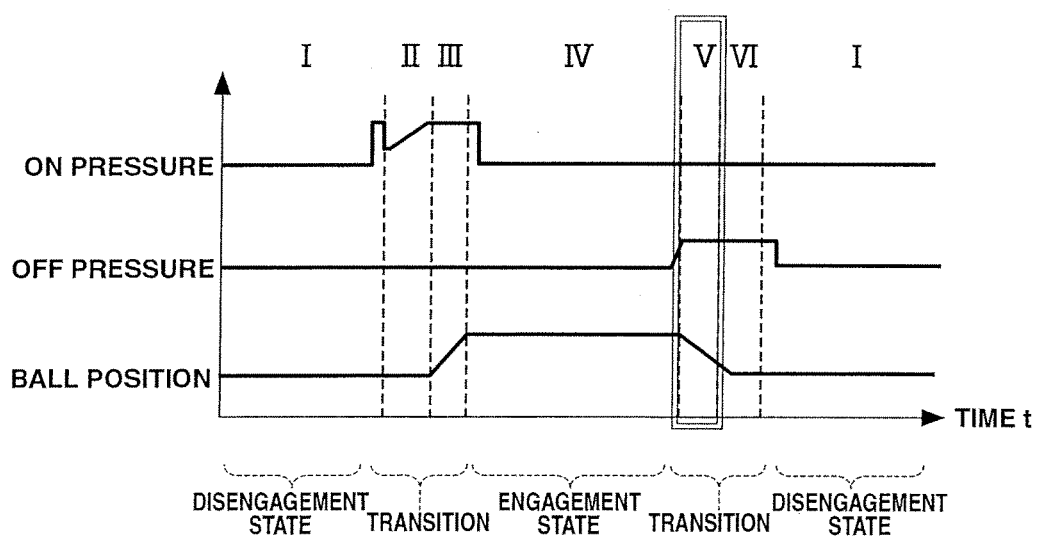

In order to progress the operation of the forward clutch 5 from the lock holding state shown in FIG. 8 to the lock state, when continuing holding the OFF pressure, as shown by an arrow F in FIG. 9A, the ball holding piston 67 moves in the axial direction (in a direction moving away from the forward clutch 5) from a holding position of the ball 68 by the holding piston side lock surface 67e to a holding-release position by the fact that the OFF pressure acts on the ball holding piston 67. At this time, as shown in FIG. 9B, the ON pressure remains unchanged at 0 (zero) pressure. The OFF pressure having risen is held. The ball position is still at the lock position.

End Transition (Movement of Hydraulic Piston is in Progress) of "Clutch CLOSE"→"Clutch OPEN"

Figure 10A:
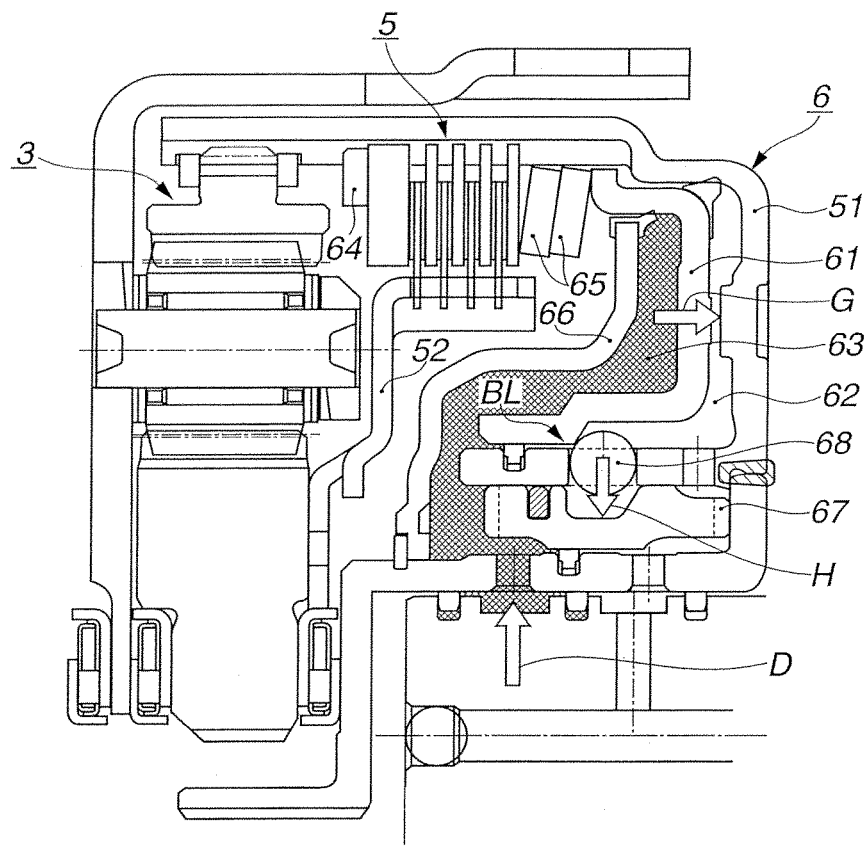
FIGS. 10A and 10B are drawings for explaining the disengagement operation state of the forward clutch by the friction engagement device of the embodiment 1.
Figure 10B:
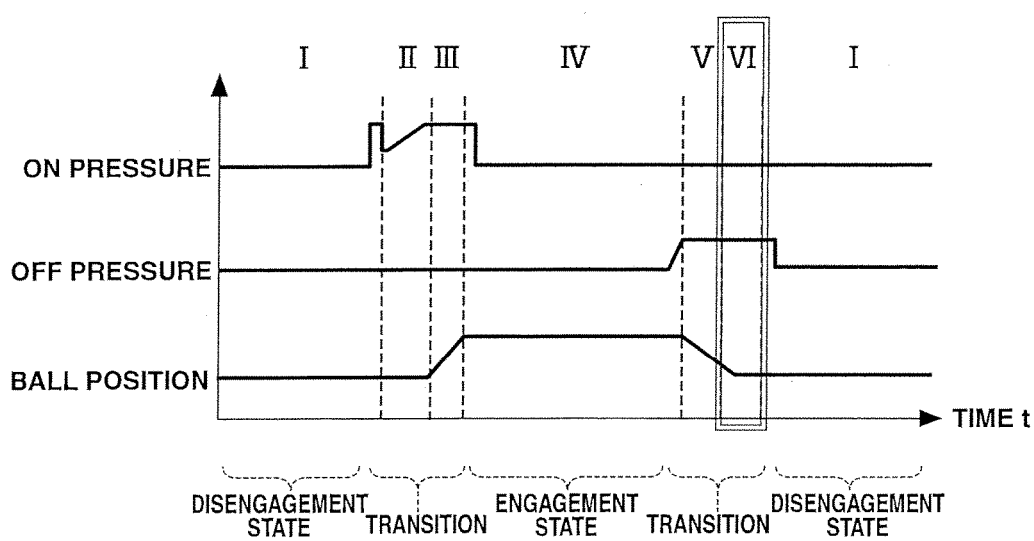

In order to progress the operation of the forward clutch 5 from the state shown in FIG. 9 to the disengagement state, when holding the OFF pressure, a combined force of a hydraulic pressure force by the OFF pressure and a reaction force of the biasing engagement force of the diaphragm spring 65 acts on the hydraulic piston 61, then the hydraulic piston 61 moves in a return direction as shown by an arrow G in FIG. 10A. Also, as shown by an arrow H in FIG. 10A, the ball 68 is pushed back in a lock release direction by the stroke (the movement) of the hydraulic piston 61. At this time, as shown in FIG. 10B, the ON pressure remains unchanged at 0 (zero) pressure. The OFF pressure having risen is held. The ball position shifts from the lock position to the lock release position.

End Transition (after Movement of Hydraulic Piston) of "Clutch CLOSE"→"Clutch OPEN"

Figure 11A:
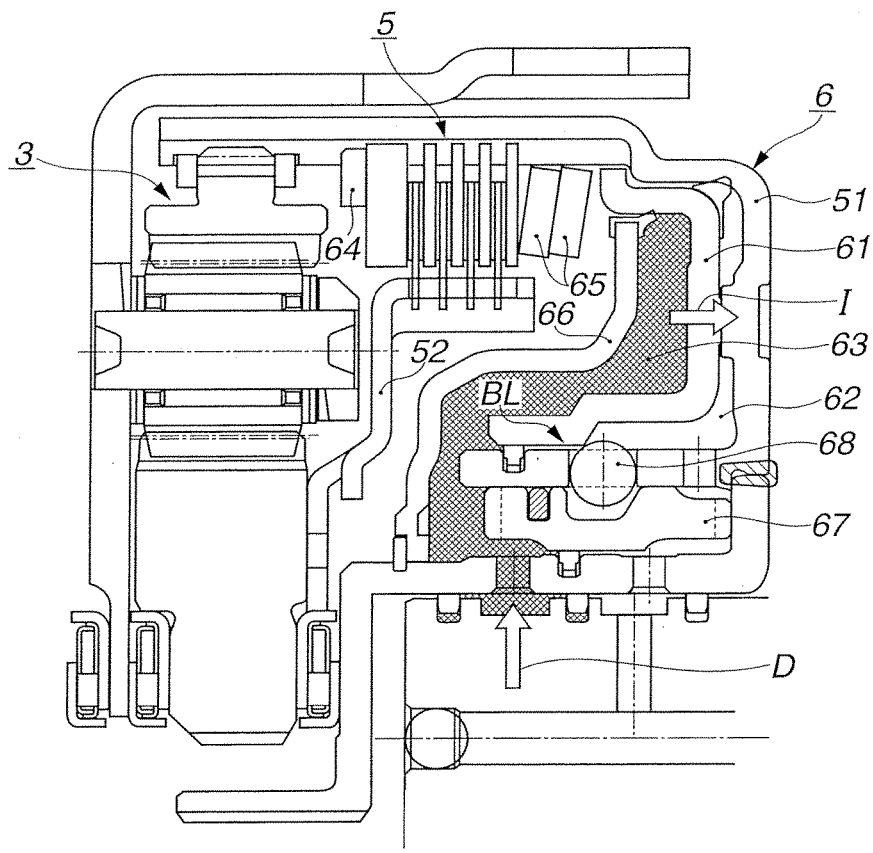
FIGS. 11A and 11B are drawings for explaining the disengagement operation state of the forward clutch by the friction engagement device of the embodiment 1.
Figure 11B:
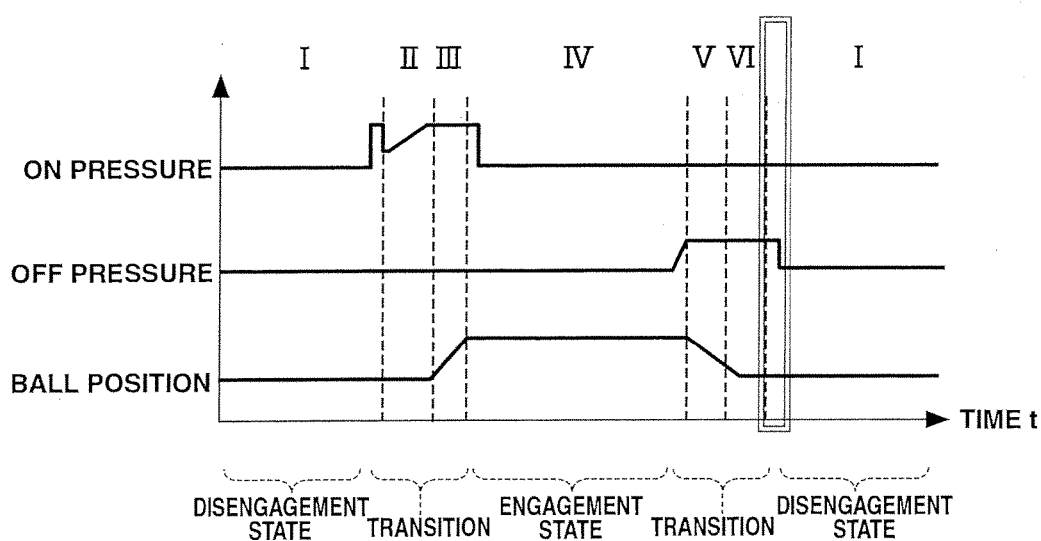

In order to further progress the operation of the forward clutch 5 from the state shown in FIG. 10 to the disengagement state, when holding the OFF pressure, mainly the hydraulic pressure force by the OFF pressure acts on the hydraulic piston 61, then the hydraulic piston 61 completely moves up to a return position as shown by an arrow I in FIG. 11A. At this time, as shown in FIG. 11B, the ON pressure remains unchanged at 0 (zero) pressure. The characteristic of the OFF pressure decreases to 0 (zero) pressure at a time of completion of the return of the hydraulic piston 61. The ball position becomes the lock release position.

Disengagement State by "Clutch OPEN"

Figure 12A:
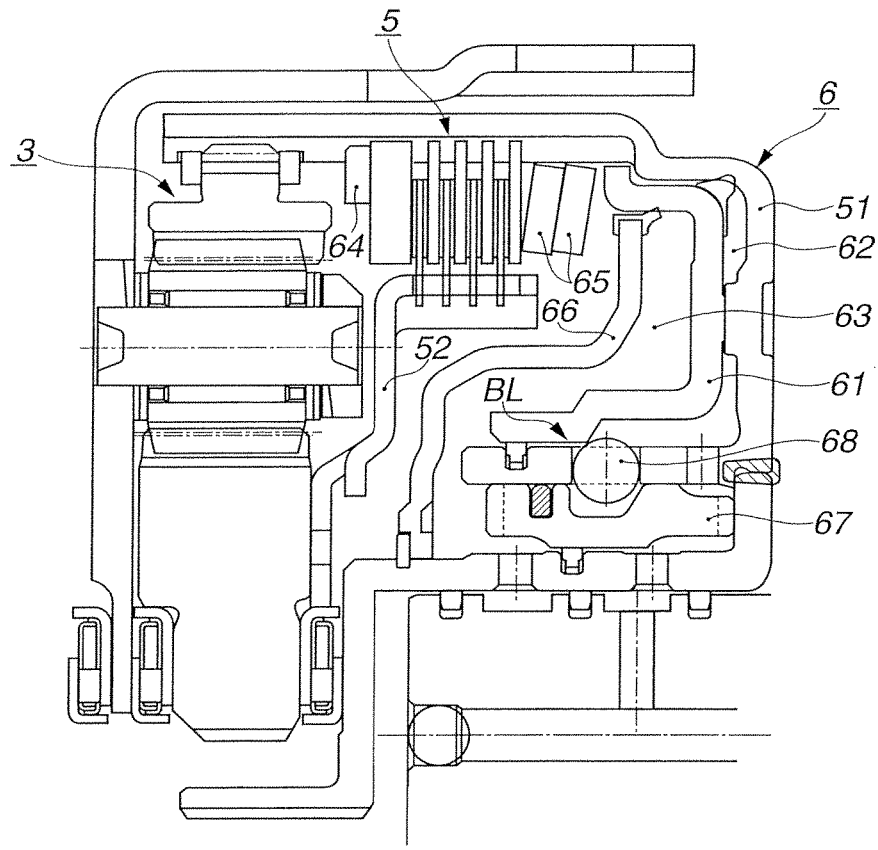
FIGS. 12A and 12B are drawings for explaining the disengagement operation state of the forward clutch by the friction engagement device of the embodiment 1.
Figure 12B:
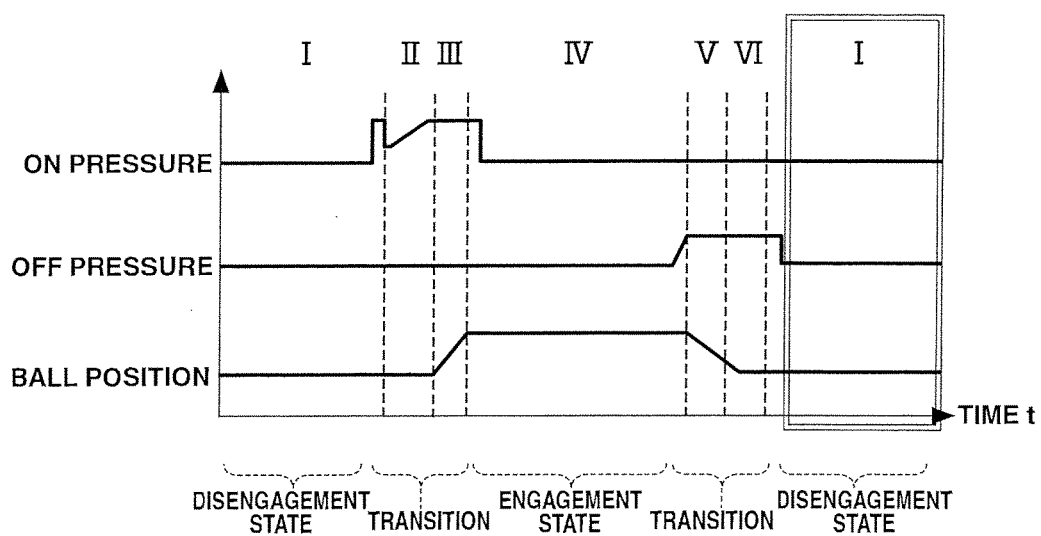

When draining the OFF pressure (the disengagement pressure) having been exerted on the disengagement pressure piston chamber 63 after progressing the operation of the forward clutch 5 to the disengagement state shown in FIG. 11, as shown in FIG. 12A, the disengagement state, in which the ball 68 is accommodated in the holding piston side accommodating portion 67c of the ball holding piston 67, is maintained. At this time, as shown in FIG. 12B, the ON pressure and the OFF pressure remain unchanged at 0 (zero) pressure. The ball position is kept at the lock release position.

[Clutch Engagement/Disengagement Operation Using Ball Lock Mechanism]

Feature of the clutch operation pack 6 that engages/disengages the forward clutch 5 is a structure in which the diaphragm spring 65 is used for a piston pressing force required for the clutch engagement and the hydraulic pressure (the ON pressure and the OFF pressure) is used only in the transition during which the disengagement and the engagement are changed.

Figure 13A:
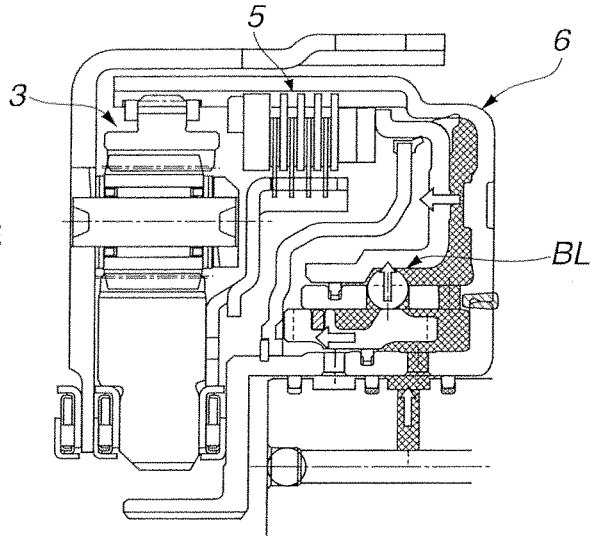
FIGS. 13A to 13C are drawings for explaining a lock operation by a ball lock mechanism of a clutch operation mechanism in the friction engagement device of the embodiment 1.

That is, regarding the changeover from the clutch disengagement to the clutch engagement of the forward clutch 5, as shown by <FWD/C ON PRESSURE CHARGE> in FIG. 13A, by supplying the ON pressure, the hydraulic piston 61 moves while the diaphragm spring 65 is being compressed. After the stroke (the movement) of the hydraulic piston 61, the ball 68 moves and the ball holding piston 67 moves, then the lock by the ball 68 is completed.

Figure 13B:
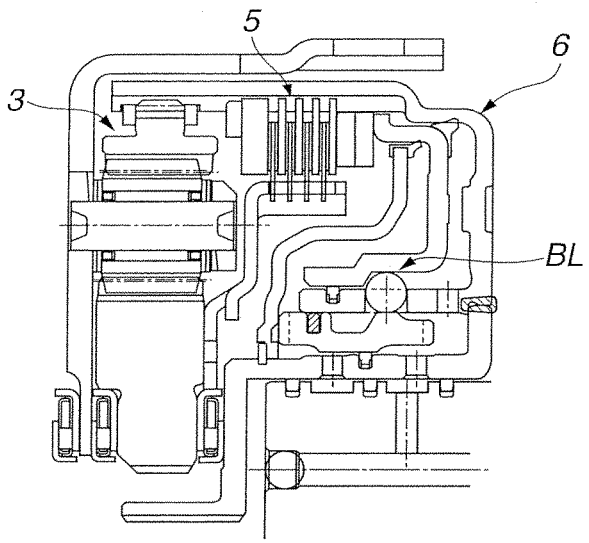

At the clutch engagement of the forward clutch 5, as shown by <HYDRAULIC PRESSURE OFF> in FIG. 13B, the position of the hydraulic piston 61 is fixed by the ball 68, then by the hydraulic pressure OFF (both of the ON pressure and the OFF pressure are drained), the clutch engagement can be held (the engagement holding pressure is unnecessary).

Figure 13C:
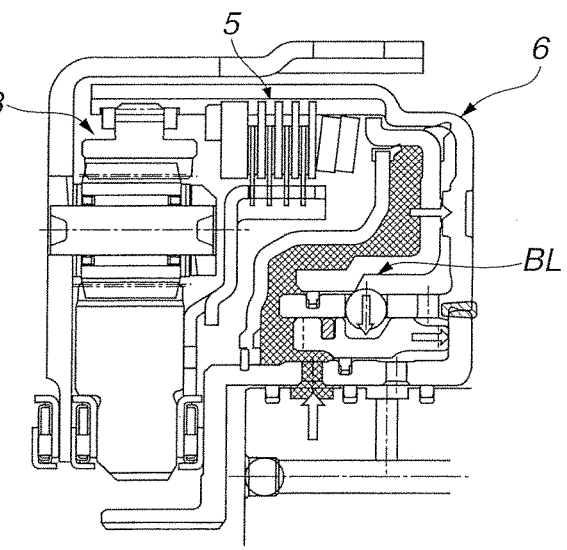

With regard to the changeover from the clutch engagement to the clutch disengagement of the forward clutch 5, as shown by <FWD/C OFF PRESSURE CHARGE> in FIG. 13C, by supplying the OFF pressure, the ball holding piston 67 moves, and the lock by the ball 68 is released.

As explained above, according to the friction engagement device of the embodiment 1, when exerting the ON pressure (the engagement pressure) on the engagement pressure piston chamber 62 and moving the hydraulic piston 61 in the engagement direction approaching the forward clutch 5, by the ball lock mechanism BL, the movement, in the disengagement direction, of the hydraulic piston 61 is restrained at the position where the forward clutch 5 is in the engagement state by the biasing engagement force of the diaphragm spring 65 (FIGS. 3 to 6). Then, after restraining the movement of the hydraulic piston 61, even when the ON pressure (the engagement pressure) of the engagement pressure piston chamber 62 is drawn, the restraint of the disengagement direction movement of the hydraulic piston 61 is maintained (FIG. 7).

That is to say, only by exerting the ON pressure only in the transition during which the forward clutch 5 shifts from the disengagement state to the engagement state, even when the ON pressure of the engagement pressure piston chamber 62 is drawn after the shift to the engagement state is completed, by the restraint of the movement of the hydraulic piston 61 by the ball lock mechanism BL, also by the biasing engagement force by the diaphragm spring 65 at a movement restraint position of the hydraulic piston 61, the forward clutch 5 is held in an engagement holding state.

Figure 14:
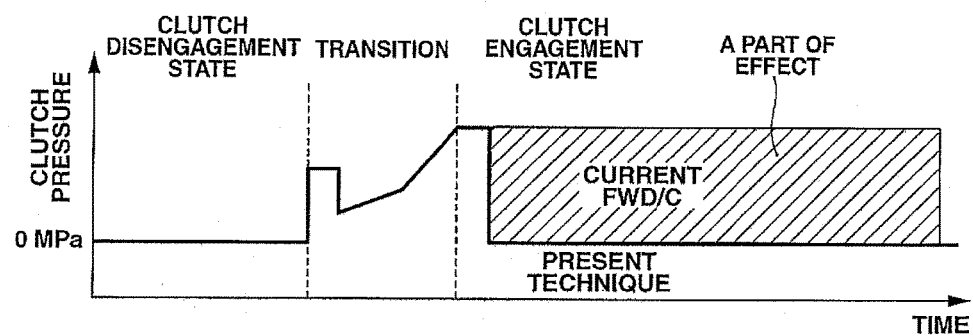
FIG. 14 is a clutch pressure characteristic showing a comparative characteristic of an engagement holding pressure between the friction engagement device of the embodiment 1 and a common friction engagement device (current FWD/C).

In this way, by eliminating the need for the engagement holding pressure of the forward clutch 5, an engagement operation energy of the forward clutch 5 is reduced. Then, in a case of an engine vehicle, since a drive load of a hydraulic pump by the engine is lightened, fuel economy is improved. Especially in the case of the embodiment 1, since the frictional engagement element employing the ball lock mechanism BL is the forward clutch 5 that is engaged at the forward travel range (D-range), an engagement holding pressure unnecessary state is maintained for a long time throughout the travelling with the forward travel range selected. Consequently, as compared with a current FWD/C that requires the engagement holding pressure of the forward clutch, a part of effect by eliminating the need for the engagement holding pressure, shown by a hatching area in FIG. 14, is produced.

In the embodiment 1, as the lock mechanism performing a locking operation and a lock releasing operation of the hydraulic piston 61, the ball lock mechanism BL, having the ball holding piston 67 and the ball 68 that receives the force from both the hydraulic piston 61 and the ball holding piston 67 by the axial direction movement of the both pistons 61 and 67 by exerting of the ON pressure or the OFF pressure and moves in the radial direction between the lock position and the lock release position, is employed. In this manner, by using the ON pressure supply and the OFF pressure supply for the locking operation and the lock releasing operation of the hydraulic piston 61, a compact and simple structure or configuration of the lock mechanism is achieved, and accurate locking operation and lock releasing operation are ensured.

In the embodiment 1, as the elastic member providing the biasing engagement force to the forward clutch 5, the diaphragm spring 65, set between the clutch side end surface 61c of the hydraulic piston 61 and the piston side end surface 5a of the forward clutch 5, is employed. Therefore, as compared with a coil spring etc., setting of the elastic member in a narrow space becomes possible, and a great biasing engagement force required to engage the forward clutch 5 can be obtained.

[Comparison with Comparative Example that Requires No Engagement Holding Pressure]

The multiple disc clutch in the automatic transmission (including step-AT, CVT) is a component that, by connecting an input shaft and an output shaft, transmits power with both shafts made the same rotation. The clutch drum, which is one of components forming the multiple disc clutch, retains the plates for transmitting the power and has a function as a hydraulic chamber of the piston which produces the pressing force for engaging the plates.

Figure 15:
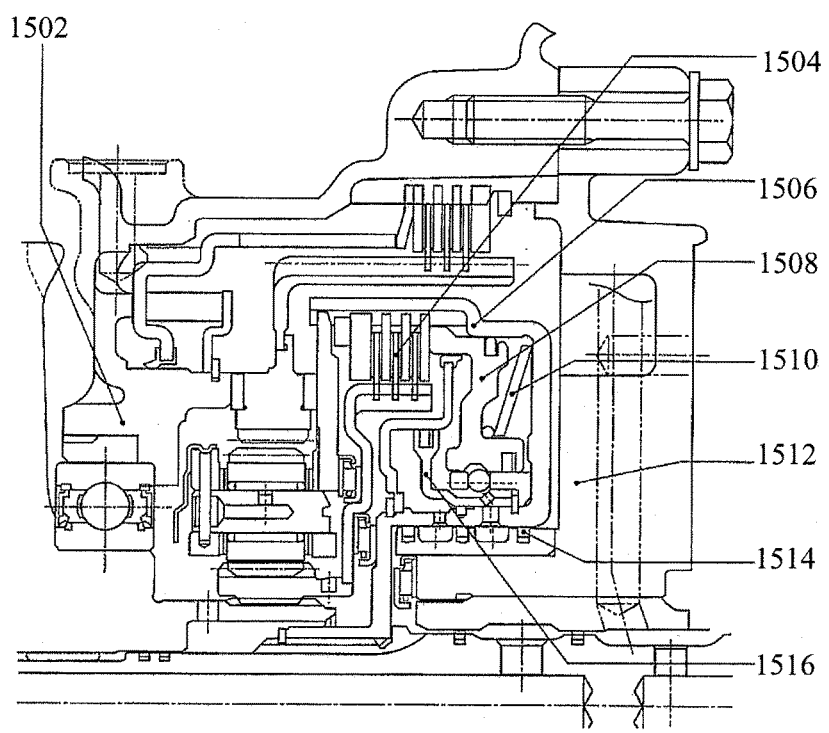
FIG. 15 is a sectional view of a forward-reverse switching mechanism of a belt-type continuously variable transmission to which a friction engagement device of a comparative example is applied.

As a structure of the above multiple disc clutch, as compared with a common multiple disc clutch whose engagement/disengagement is performed by the hydraulic piston and a return spring, for instance, FIG. 15 shows a comparative example in which a ball lock mechanism that maintains the clutch disengagement state is provided, which ball lock mechanism includes a ball holding piston 1516 and is disposed in a case 1502. In the apparatus of FIG. 15, a heavy load diaphragm spring 1510 is set between a clutch drum 1506 and a hydraulic piston 1508, which serves to apply the piston pressing force to engage plate 1504. The drum 1506 is supported by a drum support 1512 which is proximal to a seal ring 1514.

In a clutch of the above comparative example, the piston pressing force required for the clutch engagement is all covered with a reaction force of the diaphragm spring 1510. Because of this, in a case of high capacity unit or a planetary gear structure having a high torque share ratio, the diaphragm spring 1510 must be even heavier, thus it might be required to hugely expand a layout and to increase cost.

Further, when disengaging the clutch, it is required to produce, by the OFF pressure, a high load that is greater than or overcomes that of this diaphragm spring 1510. As a consequence, the OFF pressure becomes a high pressure, which results in a structure in which the clutch disengagement is difficult. Here, from the viewpoint of fail-safe design, the disengagement of the clutch should be done easily. The comparative example has a disadvantage in this point.

In contrast to this comparative example, in the embodiment 1, the ball lock mechanism BL is configured to maintain the clutch engagement state and to be free in the clutch disengagement state, which is opposite to the comparative example. Further, in the embodiment 1, the diaphragm spring 65 is disposed at a forward clutch 5 side with respect to the hydraulic piston 61. That is, in the case of the comparative example, while the hydraulic pressure is low when performing the clutch engagement, high pressure is required when performing the clutch disengagement. In contrast to this, in the embodiment 1, the configuration, in which functions of the engagement pressure piston chamber 62 and the disengagement pressure piston chamber 63 are reversed so that high pressure is required when performing the clutch engagement and the hydraulic pressure is low when performing the clutch disengagement, is employed.

Thus, the configuration of the embodiment 1 and the configuration of the comparative example are the same in the structure in which the clutch pressure is necessary only in the transition of the changeover between the clutch engagement and the clutch disengagement. However, in the embodiment 1, since the structure or configuration in which the diaphragm spring 65 is compressed by the hydraulic pressure (the ON pressure) when performing the engagement is employed, it becomes possible to obtain the piston pressing force by the combined force of the reaction force of the diaphragm spring 65 and the hydraulic pressure force. With this, when high torque is required as a transmission torque capacity of the forward clutch 5, not only by the reaction force of the diaphragm spring 65, but assist by the hydraulic pressure force by the hydraulic pressure supply to the engagement pressure piston chamber 62 becomes possible. Therefore, there is no need to previously install the heavy load diaphragm spring for the requirement of the high torque.

In addition, when performing the clutch disengagement, the hydraulic pressure (the OFF pressure) to the disengagement pressure piston chamber 63 can be low. The reason of this is because not only there is no need to produce the hydraulic pressure force that is greater than or overcomes the biasing engagement force of the diaphragm spring 65, but also the biasing engagement force of the diaphragm spring 65 acts on the hydraulic piston 61 as a return force. In this way, by setting the hydraulic pressure (the OFF pressure) required when performing the clutch disengagement to the low pressure, in a situation where the forward clutch 5 is forcefully disengaged upon failure, the clutch disengagement can be possible even by a pump residual pressure or a low pressure sub-electric oil pump.

Next, effect will be explained.

The friction engagement device of the embodiment 1 obtains the following effects.

(1) In a friction engagement device having a frictional engagement element (a forward clutch 5) that is formed by a first friction plate (a driven plate 53) and a second friction plate (a drive plate 54) respectively connected slidably in an axial direction to a first member (a forward clutch drum 51) and a second member (a forward clutch hub 52) that are coaxially arranged with each other and a frictional engagement element operating unit (a clutch operation pack 6) that controls engagement/disengagement operation of the frictional engagement element (the forward clutch 5), the frictional engagement element operating unit (the clutch operation pack 6) has; a hydraulic piston 61 that is set movably in the axial direction with respect to the frictional engagement element (the forward clutch 5) and has an engagement pressure receiving surface 61a; an engagement pressure piston chamber 62 that exerts an engagement pressure (ON pressure) on the engagement pressure receiving surface 61a of the hydraulic piston 61; an engagement reaction force receiving member (a snap ring 64) that is set in an opposite side position to the hydraulic piston 61 with the frictional engagement element (the forward clutch 5) located between the engagement reaction force receiving member (the snap ring 64) and the hydraulic piston 61 and receives an engagement reaction force from the frictional engagement element (the forward clutch 5); an elastic member (a diaphragm spring 65) that is set between an element side end surface (a clutch side end surface 61c) of the hydraulic piston 61 and an engagement reaction force receiving surface 64a of the engagement reaction force receiving member (the snap ring 64) and provides a biasing engagement force to the frictional engagement element (the forward clutch 5) by moving the hydraulic piston 61 in an engagement direction toward the engagement reaction force receiving member (the snap ring 64); and a lock mechanism (a ball lock mechanism BL) that restrains movement, in a disengagement direction, of the hydraulic piston 61 at a position where the frictional engagement element (the forward clutch 5) is in an engagement state by the biasing engagement force when exerting the engagement pressure (the ON pressure) on the engagement pressure piston chamber 62 and moving the hydraulic piston 61 in the engagement direction approaching the frictional engagement element (the forward clutch 5), and after restraining the movement of the hydraulic piston 61, maintains the restraint of the disengagement direction movement of the hydraulic piston 61 even when the engagement pressure of the engagement pressure piston chamber 62 is drawn.

Therefore, by eliminating the need for the engagement holding pressure of the frictional engagement element (the forward clutch 5), the engagement operation energy of the frictional engagement element (the forward clutch 5) and also the friction of the seal ring can be reduced.

(2) When exerting the engagement pressure (the ON pressure) on the engagement pressure piston chamber 62 after restraining the disengagement direction movement of the hydraulic piston 61 at the position where the frictional engagement element (the forward clutch 5) is in the engagement state by the biasing engagement force, the lock mechanism (the ball lock mechanism BL) maintains the restraint of the disengagement direction movement of the hydraulic piston 61 while allowing an engagement direction movement of the hydraulic piston 61.

Thus, in addition to the effect of (1), when high torque is required as a transmission torque capacity of the frictional engagement element (the forward clutch 5), the biasing engagement force by the elastic member (the diaphragm spring 65) can be assisted by the hydraulic pressure force by the hydraulic pressure supply to the engagement pressure piston chamber 62.

(3) The hydraulic piston 61 has a disengagement pressure receiving surface 61b at an opposite side to the engagement pressure receiving surface 61a, a disengagement pressure piston chamber 63 that exerts a disengagement pressure (OFF pressure) on the disengagement pressure receiving surface 61b of the hydraulic piston 61 is provided, and the lock mechanism (the ball lock mechanism BL) releases the restraint of the disengagement direction movement of the hydraulic piston 61 by exerting the disengagement pressure on the disengagement pressure piston chamber 63.

Therefore, in addition to the effects of (1) and (2), by setting the hydraulic pressure (the OFF pressure) required when performing the clutch disengagement to the low pressure, in a situation where the frictional engagement element (the forward clutch 5) is forcefully disengaged upon failure, the clutch disengagement can be possible even by a pump residual pressure or a low pressure sub-electric oil pump.

(4) The lock mechanism is a ball lock mechanism BL having; a ball holding piston 67 that is disposed in a cylindrical space defined by an inner peripheral cylinder portion 51a of a drum member (a forward clutch drum 51) that covers the hydraulic piston 61 and a partition cylindrical wall portion 51b that protrudes from the drum member (the forward clutch drum 51) in the axial direction, and moves in the axial direction by the exerting of the engagement pressure (the ON pressure) and the disengagement pressure (the OFF pressure); and a ball 68 that is set in a ball hole 51c that opens at the partition cylindrical wall portion 51b, receives a force from each of the hydraulic piston 61 and the ball holding piston 67 according to the axial direction movement of the both pistons 61, 67 by the exerting of the engagement pressure (the ON pressure) and the disengagement pressure (the OFF pressure), and moves in a radial direction between a lock position and a lock release position.

Therefore, in addition to the effects of (1) to (3), by using the engagement pressure supply (ON pressure charge) and the disengagement pressure supply (OFF pressure charge) for the locking operation and the lock releasing operation of the hydraulic piston 61, a compact and simple structure or configuration of the lock mechanism is achieved, and accurate locking operation and lock releasing operation are ensured.

(5) The elastic member is a diaphragm spring 65 that is set between the element side end surface (the clutch side end surface 61c) of the hydraulic piston 61 and a piston side end surface 5a of the frictional engagement element (the forward clutch 5).

Therefore, in addition to the effects of (1) to (4), setting of the elastic member in a narrow space becomes possible, and a great biasing engagement force required to engage the frictional engagement element (the forward clutch 5) can be obtained.

(6) A forward-reverse switching mechanism P having a planetary gear 3 between a drive input shaft 1 from a drive source (an engine) and a transmission input shaft 2 to a continuously variable transmission (a belt-type continuously variable transmission) is provided, the first member is a forward clutch drum 51 that connects the drive input shaft 1 and one (a ring gear 32) of rotary members of the planetary gear 3, the second member is a forward clutch hub 52 that is connected to one (a sun gear 31) of remaining two rotary members of the planetary gear 3, and the frictional engagement element is a forward clutch 5 that is installed between the forward clutch drum 51 and the forward clutch hub 52 and is engaged when selecting a forward travel range (D-range etc.).

Therefore, in addition to the effects of (1) to (5), throughout the travel with the forward travel range (D-range etc.), in which the engagement holding pressure unnecessary state is maintained for a longtime, selected, high pump load lightening effect can be achieved.

Although the friction engagement device of the present invention has been explained above on the basis of the embodiment 1, the specific configuration or structure is not limited to the embodiment 1 described above. Configuration or structure in the above embodiment includes all design modifications and equivalents belonging to the technical scope of the present invention.

The embodiment 1 shows the example using, as the lock mechanism, the ball lock mechanism BL having the ball holding piston 67 and the ball 68 that receives the force from both the hydraulic piston 61 and the ball holding piston 67 by the axial direction movement of the both pistons 61 and 67 by exerting of the ON pressure or the OFF pressure and moves in the radial direction between the lock position and the lock release position. However, as the lock mechanism, other mechanism such as a pin lock mechanism or a dog clutch mechanism can be used. That is, as long as a mechanism at least restrains the movement of the hydraulic piston with the frictional engagement element being in the engagement state and maintains the movement restraint state (the lock state) of the hydraulic piston even when the engagement pressure of the engagement pressure piston chamber is drawn after the restraint of the movement of the hydraulic piston, various lock mechanisms can be used.

The embodiment 1 shows the example using, as the elastic member, the diaphragm spring 65 set between the clutch side end surface 61c of the hydraulic piston 61 and the piston side end surface 5a of the forward clutch 5. However, as the elastic member, the coil spring etc. except the diaphragm spring can be used. Further, as long as the elastic member is set at any position between the clutch side end surface 61c of the hydraulic piston 61 and the engagement reaction force receiving surface 64a of the snap ring 64 (the engagement reaction force receiving member), its position is not limited. For instance, the elastic member could be disposed in a position of the retainer plate 55.

The embodiment 1 shows the example in which the friction engagement device of the present invention is applied to the forward clutch provided in the forward-reverse switching mechanism of the belt-type continuously variable transmission (CVT) of the engine vehicle. However, besides the engine vehicle, the friction engagement device of the present invention can be applied to an electric vehicle such as a hybrid vehicle. Furthermore, besides the belt-type continuously variable transmission (CVT), the friction engagement device of the present invention can be applied to the transmission frictional engagement element (such as the multiple disc clutch and the multiple disc brake) used in the automatic transmission (step-AT). Moreover, the friction engagement device of the present invention can be applied to a friction engagement device such as a start clutch that is provided in a driveline separately from the transmission in the vehicle.

EXPLANATION OF REFERENCE

P . . . forward-reverse switching mechanism
1 . . . drive input shaft
2 . . . transmission input shaft
3 . . . planetary gear
31 . . . sun gear (rotary member)
32 . . . ring gear (rotary member)
33 . . . pinion
34 . . . carrier (rotary member)
4 . . . reverse brake
5 . . . forward clutch (frictional engagement element)
5a . . . piston side end surface
51 . . . forward clutch drum (first member)
51a . . . inner peripheral cylinder portion
51b . . . partition cylindrical wall portion
51c . . . ball hole
52 . . . forward clutch hub (second member)
53 . . . driven plate (first friction plate)
54 . . . drive plate (second friction plate)
6 . . . clutch operation pack
61 . . . hydraulic piston
61a . . . engagement pressure receiving surface
61b . . . disengagement pressure receiving surface
61c . . . clutch side end surface
62 . . . engagement pressure piston chamber
63 . . . disengagement pressure piston chamber
64 . . . snap ring (engagement reaction force receiving member)
64a . . . engagement reaction force receiving surface
65 . . . diaphragm spring (elastic member)
66 . . . partition plate
BL . . . ball lock mechanism (lock mechanism)
67 . . . ball holding piston
68 . . . ball

The invention claimed is:

1. A friction engagement device comprising:
a frictional engagement element that is formed by a first friction plate and a second friction plate respectively connected slidably in an axial direction to a first member and a second member that are coaxially arranged with each other; and
a frictional engagement element operating unit that controls engagement/disengagement of the frictional engagement element, and includes
a hydraulic piston that is set movably in the axial direction with respect to the frictional engagement element and has an engagement pressure receiving surface;
an engagement pressure piston chamber that exerts an engagement pressure on the engagement pressure receiving surface of the hydraulic piston;
an engagement reaction force receiving member that is set in an opposite side position of the frictional engagement element than the hydraulic piston, with the frictional engagement element located between the engagement reaction force receiving member and the hydraulic piston, and receives an engagement reaction force from the frictional engagement element;
an elastic member that is set between an element side end surface of the hydraulic piston and an engagement reaction force receiving surface of the engagement reaction force receiving member and provides a biasing engagement force to the frictional engagement element by moving the hydraulic piston in an engagement direction toward the engagement reaction force receiving member; and
a lock mechanism that restrains movement, in a disengagement direction, of the hydraulic piston at a position where the frictional engagement element is in an engagement state by the biasing engagement force when exerting the engagement pressure on the engagement pressure piston chamber and moving the hydraulic piston in the engagement direction approaching the frictional engagement element, and after restraining the movement in the disengagement direction of the hydraulic piston, maintains restraint of the movement in the disengagement direction of the hydraulic piston even when the engagement pressure of the engagement pressure piston chamber is drawn and no pressure remains in the friction engagement device,
wherein the lock mechanism is a ball lock mechanism comprising
a ball holding piston that is disposed in a cylindrical space defined by an inner peripheral cylinder portion of a drum member that covers the hydraulic piston and a partition cylindrical wall portion that protrudes from the drum member in the axial direction, the ball holding piston moving in the axial direction by exertion of the engagement pressure and a disengagement pressure; and
a ball that is set in a ball hole that opens at the partition cylindrical wall portion, and receives a force from each of the hydraulic piston and the ball holding piston according to the movement in the axial direction of both pistons by exertion of the engagement pressure and the disengagement pressure, the ball moving in a radial direction between a lock position and a lock release position.

2. The friction engagement device as claimed in claim 1, wherein:
when exerting the engagement pressure on the engagement pressure piston chamber after restraining the movement in the disengagement direction of the hydraulic piston at the position where the frictional engagement element is in the engagement state by the biasing engagement force, the lock mechanism maintains the restraint of the movement in the disengagement direction of the hydraulic piston while allowing an engagement direction movement of the hydraulic piston.

3. The friction engagement device as claimed in claim 1, wherein:
the hydraulic piston has a disengagement pressure receiving surface at an opposite side of the hydraulic piston than the engagement pressure receiving surface, the disengagement pressure piston chamber that exerts a disengagement pressure on the disengagement pressure receiving surface of the hydraulic piston is provided, and the lock mechanism releases the restraint of the movement in the disengagement direction of the hydraulic piston by exerting the disengagement pressure on the disengagement pressure piston chamber.

4. The friction engagement device as claimed in claim 1, wherein:

the elastic member is a diaphragm spring that is set between the element side end surface of the hydraulic piston and a piston side end surface of the frictional engagement element.

5. The friction engagement device as claimed in claim 1, further comprising a forward-reverse switching mechanism having a planetary gear between a drive input shaft from a drive source and a transmission input shaft to a continuously variable transmission, wherein:

the first member is a forward clutch drum that connects the drive input shaft and one of rotary members of the planetary gear, the second member is a forward clutch hub that is connected to one of a remaining two rotary members of the planetary gear, and the frictional engagement element is a forward clutch that is installed between the forward clutch drum and the forward clutch hub and is engaged when selecting a forward travel range.

\* \* \* \* \*